US011523310B2

(12) United States Patent
Zhu et al.

(10) Patent No.: US 11,523,310 B2
(45) Date of Patent: Dec. 6, 2022

(54) REDIRECTION METHOD, COMMUNICATIONS SYSTEM, AND COMMUNICATIONS APPARATUS

(71) Applicant: Huawei Technologies Co., Ltd., Shenzhen (CN)

(72) Inventors: Qianghua Zhu, Beijing (CN); Fenqin Zhu, Shanghai (CN); Wenfu Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/132,947

(22) Filed: Dec. 23, 2020

(65) Prior Publication Data
US 2021/0120465 A1  Apr. 22, 2021

Related U.S. Application Data

(63) Continuation of application No. PCT/CN2019/089162, filed on May 30, 2019.

(30) Foreign Application Priority Data

Jun. 26, 2018  (CN) .......................... 201810670609.8

(51) Int. Cl.
*H04W 4/00* (2018.01)
*H04W 36/00* (2009.01)
*H04W 36/14* (2009.01)

(52) U.S. Cl.
CPC ....... *H04W 36/0055* (2013.01); *H04W 36/14* (2013.01)

(58) Field of Classification Search
CPC ............. H04W 36/0055; H04W 36/14; H04W 36/00835; H04W 36/385; H04W 36/0022
(Continued)

(56) References Cited

U.S. PATENT DOCUMENTS

2017/0188280 A1  6/2017  Watfa et al.
2017/0195926 A1  7/2017  Iwai et al.
(Continued)

FOREIGN PATENT DOCUMENTS

CN  101232731 A  7/2008
CN  101742582 A  6/2010
(Continued)

OTHER PUBLICATIONS

Motorola Mobility et al.,"UE disabling the 5G capability", SA WG2 Meeting #S2-12781S S2-185415, May 28-Jun. 1—USA, 3 pages.
(Continued)

*Primary Examiner* — Marceau Milord
(74) *Attorney, Agent, or Firm* — Conley Rose, P.C.

(57) ABSTRACT

A redirection method, a communications system, and a communications apparatus, to implement redirection of a terminal between different systems, and further implement redirection between a $5^{th}$ generation system (5GS) and an evolved packet system (EPS). The method includes: a mobility management network element in a first system determining, based on a cellular Internet of things (CIOT) feature supported by a terminal in a second system and a CIOT feature preferred by the terminal in the second system, to redirect the terminal to the second system; and the mobility management network element in the first system sending redirection indication information to the terminal, where the redirection indication information indicates the terminal to redirect to the second system.

28 Claims, 9 Drawing Sheets

(58) Field of Classification Search
USPC .......................................................... 370/331
See application file for complete search history.

(56) References Cited

U.S. PATENT DOCUMENTS

| | | | |
|---|---|---|---|
| 2017/0289858 A1 | 10/2017 | Faccin et al. | |
| 2019/0021037 A1* | 1/2019 | Shaw | H04W 36/36 |
| 2019/0037385 A1* | 1/2019 | Li | H04W 8/08 |
| 2019/0159088 A1 | 3/2019 | Shi et al. | |
| 2019/0357109 A1 | 11/2019 | Hong et al. | |
| 2019/0394683 A1* | 12/2019 | Sillanpaa | H04W 60/04 |
| 2020/0322858 A1 | 10/2020 | Liu | |

FOREIGN PATENT DOCUMENTS

| | | |
|---|---|---|
| CN | 102143560 A | 8/2011 |
| CN | 102892144 A | 1/2013 |
| CN | 104581675 A | 4/2015 |
| CN | 105519189 A | 4/2016 |
| CN | 105657753 A | 6/2016 |
| CN | 105992293 A | 10/2016 |
| CN | 106471846 A | 3/2017 |
| CN | 107734573 A | 2/2018 |
| CN | 104471980 B | 5/2019 |
| EP | 2654345 A1 | 10/2013 |
| EP | 3499966 A1 | 6/2019 |
| JP | 2014512747 A | 5/2014 |
| JP | 2017518006 A | 6/2017 |
| KR | 20180011450 A | 2/2018 |
| WO | 2017170123 A1 | 10/2017 |
| WO | 2018006017 A1 | 1/2018 |
| WO | 2018029932 A1 | 2/2018 |
| WO | 2018065270 A1 | 4/2018 |
| WO | 2018085187 A1 | 5/2018 |
| WO | 2019119236 A1 | 6/2019 |

OTHER PUBLICATIONS

Ericsson, "IW HO from 5G to 4G," 3GPP TSG SA WG3 (Security) Meeting #90bis, S3-180708, Feb. 26-Mar. 2, 2018, San Diego, US, 4 pages.

Huawei., et al., "Network selection for initial access in E-UTRA connected to 5GC," 3GPP TSG-RAN WG2 Meeting #99, R2-1708401, Berlin, Germany, Aug. 21-25, 2017, 3 pages.

HTC, "Network controlled mobility to 5GC or EPC," 3GPP TSG-RAN WG2#101bis, R2-1805950, Sanya, China, Apr. 16-20, 2018, 17 pages.

Xiao Zi-yu, "5G core network standards overview," Telecom Engineering Technics and Standardization, Jan. 3, 2017, with an English abstract, 6 pages.

Google, "Discussion on redirection information," 3GPP TSG-RAN WG2 NR RAN2#101, R2-1802596, Athens, Greece, Feb. 26-Mar. 2, 2018, 5 pages.

3GPP TS 23.501 V15.2.0, "3rd Generation Partnership Project; Technical Specification Group Services and System Aspects; System Architecture for the 5G System; Stage 2 (Release 15)," Jun. 2018, 217 pages.

3GPP TS 23.502 V15.2.0, "3rd Generation Partnership Project; Technical Specification Group Services and System Aspects; Procedures for the 5G System; Stage 2 (Release 15)," Jun. 2018, 308 pages.

3GPP TR 23.724 V0.4.0, "3rd Generation Partnership Project; Technical Specification Group Services and System Aspects; Study on Cellular IoT support and evolution for the 5G System (Release 16)," Jun. 2018, 180 pages.

3GPP TS 24.501 V15.0.0, "3rd Generation Partnership Project; Technical Specification Group Core Network and Terminals; Non-Access-Stratum (NAS) protocol for 5G System (5GS); Stage 3 (Release 15)," Jun. 2018, 338 pages.

LG Electronics, S2-183378, "Handover Type for eLTE Connected Both 5GC and EPC," 3GPP TSG-SA WG2 Meeting #127, Apr. 10, 2018, 10 pages.

Qualcomm Inc, SA WG2 Meeting #127bis, S2-185738 (was S2-184753), "Key Issue on Core Network selection for Cellular IoT," May 28-Jun. 1, 2018, Newport Beach, USA, 3 pages.

Qualcomm Inc, SA WG2 Meeting #127bis, S2-185794 (was S2-185738 was S2-184753), "Key Issue on Core Network selection for Cellular IoT," May 28-Jun. 1, 2018, Newport Beach, USA, 3 pages.

Huawei, "Solution for KI15: Core Network selection for Cellular Iot," 3GPP TSG SA WG2 #128, S2-186732, Jul. 2018, 19 pages.

Huawei, "Key Issue on infrequent small data transmission," SA WG2 Meeting #125, S2-181244, Gothenburg, Jan. 22-26, 2018, 2 Pages.

* cited by examiner

REDIRECTION METHOD, COMMUNICATIONS SYSTEM, AND COMMUNICATIONS APPARATUS

CROSS-REFERENCE TO RELATED APPLICATIONS

This application is a continuation of International Patent Application No. PCT/CN2019/089162, filed on May 30, 2019, which claims priority to Chinese Patent Application No. 201810670609.8, filed on Jun. 26, 2018. The disclosures of the aforementioned applications are hereby incorporated by reference in their entireties.

TECHNICAL FIELD

This application relates to the communications field, and more specifically, to a redirection method, a communications system, and a communications apparatus.

BACKGROUND

A cellular Internet of things (CIOT) is an Internet of things that implements access of a CIOT terminal to a mobile communications network using a narrowband IOT (NB-IoT) access technology or an enhanced machine type communication (eMTC) access technology. A typical CIOT system is an evolved packet system (EPS). To adapt to a service requirement for a higher speed, the 3rd generation partnership project (3GPP) defines a 5th generation (5G) mobile communications system (5GS). A CIOT terminal that supports a CIOT 5GS feature and a CIOT EPS feature may access the EPS, or may access the 5GS. However, when the CIOT terminal accesses a 5th generation system core (5GC), the 5GC may redirect the CIOT terminal to an evolved packet core (EPC) according to an operator policy or based on a load balancing requirement. Alternatively, when the CIOT terminal accesses an EPC, the EPC may redirect the CIOT terminal to a 5GC according to an operator policy or based on a load balancing requirement. However, there is still no solution currently about how to specifically perform redirection.

SUMMARY

This application provides a redirection method, a communications system, and a communications apparatus, to implement redirection of a terminal between different systems, and further implement redirection between a 5GS and an EPS.

According to a first aspect, this application provides a redirection method, and the method includes: determining, by a mobility management network element in a first system, based on a CIOT feature supported by a terminal in a second system and a CIOT feature preferred by the terminal in the second system, to redirect the terminal to the second system. Then, the mobility management network element in the first system sends redirection indication information to an access network element in the first system, where the redirection indication information is used to indicate the access network element in the first system to redirect the terminal from the first system to the second system. Subsequently, the mobility management network element in the first system receives a handover required message from the access network element in the first system, where the handover required message includes first indication information, and the first indication information is used to indicate that a reason for sending the handover required message is a redirection request of the first system. Then, the mobility management network element in the first system selects a mobility management network element in the second system based on the handover required message, and sends a first message to the mobility management network element in the second system, where the first message is used to request to hand over the terminal to the second system.

Optionally, the first system may be a 5GS (or a 5GC), and the second system may be an EPS (or a 5GC). Alternatively, the first system may be an EPS (or an EPC), and the second system may be a 5GS (or an EPC). The 5GS and the EPS are used in all examples in the following. However, this application is not limited thereto.

Optionally, the first indication information is a redirect to EPC indication; the first indication information is a redirect to 5GC indication; the first indication information is inter CIOT radio access technology (RAT) redirection (or CIOT Inter-RAT Redirection); or the first indication information is inter CIOT system redirection (or CIOT Inter-System Redirection).

According to the redirection method in this embodiment of this application, when determining that redirection of the terminal to the second system needs to be triggered, the mobility management network element in the first system sends the redirection indication information to the access network element in the first system. After receiving the redirection indication information, the access network element in the first system sends the handover required message to the mobility management network element in the first system. After receiving the handover required message, the mobility management network element in the first system sends the first message to the mobility management network element in the second system to start handover, such that the terminal can be handed over from the first system to the second system. Therefore, according to the redirection method in this embodiment of this application, a problem of redirection between two different systems can be resolved. In addition, when the first system is an EPS, and the second system is a 5GS, a problem of redirection of the terminal from the EPS to the 5GS can be resolved. When the first system is a 5GS, and the second system is an EPS, a problem of redirection of the terminal from the 5GS to the EPS can be resolved.

It should be understood that the terminal in this application may be a CIOT terminal.

With reference to the first aspect, in a possible implementation, the CIOT feature supported by the terminal in the second system and the CIOT feature preferred by the terminal in the second system may be sent by the terminal to the mobility management network element in the first system.

Optionally, the CIOT feature supported by the terminal in the second system and the CIOT feature preferred by the terminal in the second system may be carried in a registration request message, an attach request message, or a tracking area update (TAU) request message. However, this application is not limited thereto. For example, when the first system is a 5GS, and the second system is an EPS, the CIOT feature supported by the terminal in the second system and the CIOT feature preferred by the terminal in the second system may be carried in the registration request message. When the first system is an EPS, and the second system is a 5GS, the CIOT feature supported by the terminal in the second system and the CIOT feature preferred by the terminal in the second system may be carried in the attach request message or the TAU request message.

It should be understood that, the terminal may further send, to the mobility management network element in the first system, a CIOT feature supported by the terminal in the first system and a CIOT feature preferred by the terminal in the first system, such that the terminal may register, with the mobility management network element in the first system, the CIOT feature supported by the terminal in the first system and the CIOT feature preferred by the terminal in the first system. For example, the CIOT feature supported by the terminal in the first system and the CIOT feature preferred by the terminal in the first system may be carried in a registration request message, an attach request message, or a TAU request message.

It should be noted that, the CIOT feature preferred by the terminal in the second system is one or more of CIOT features supported by the terminal in the second system. Similarly, the CIOT feature preferred by the terminal in the first system is one or more of CIOT features supported by the terminal in the first system.

In this application, for example, the CIOT feature may be control plane (CP) optimization and user plane (UP) optimization. The CIOT feature supported by the terminal may be either of the CP optimization and the UP optimization, or both the CP optimization and the UP optimization may be supported. However, it should be understood that the CIOT feature is not specifically limited in this application. For example, in an EPS, the CIOT feature may be EPS CP optimization and EPS UP optimization, and in a 5GS, the CIOT feature may be another feature.

With reference to the first aspect, in a possible implementation, the redirection indication information may be sent using an N2 message, for example, an N2 notify message, an N2 initial user equipment (UE) context setup message, an N2 UE context modification message, an N2 UE context release message, or an N2 downlink transport message. Alternatively, the redirection indication information may be sent using an S1 application plane (S1-AP) message, for example, an S1-AP notify message, an S1-AP initial UE context setup message, an S1-AP UE context modification message, an S1-AP UE context release message, or an S1-AP downlink transport message. For example, when the first system is a 5GS, and the second system is an EPS, the redirection indication information may be sent using the N2 message. When the first system is an EPS, and the second system is a 5GS, the redirection indication information may be sent using the S1-AP message. N2 is an interface between a mobility management network element in the 5GS and an access network element in the 5GS, and S1-AP is an interface between a mobility management network element in the EPS and an access network element in the EPS.

With reference to the first aspect, in a possible implementation, the first message may be a relocation request message or a relocation complete message. However, this embodiment of this application is not limited thereto.

With reference to the first aspect, in a possible implementation, the first message includes second indication information, and the second indication information is used to enable the mobility management network element in the second system not to redirect the terminal to the first system based on the second indication information.

Therefore, according to the redirection method in this embodiment of this application, the terminal can be prevented from being redirected from a target system (namely, the second system) back to a source system (namely, the first system).

Further, the second indication information is a redirect from 5GC indication or a redirect from EPC indication; the second indication information is inter CIOT RAT redirection (or CIOT Inter-RAT Redirection); or the second indication information is inter CIOT system redirection (or CIOT Inter-System Redirection). For example, when the first system is a 5GS, and the second system is an EPS, the second indication information is the redirect from 5GC indication. When the first system is an EPS, and the second system is a 5GS, the second indication information is the redirect from EPC indication.

According to a second aspect, this application provides a redirection method, and the method includes: receiving, by an access network element in a first system, redirection indication information sent by a mobility management network element in the first system; and after receiving the redirection indication information, sending, by the access network element in the first system, a handover required message to the mobility management network element in the first system, where the handover required message includes first indication information, and the first indication information is used to indicate that a reason for sending the handover required message is a redirection request of the first system.

Optionally, the first indication information is a redirect to EPC indication; the first indication information is a redirect to 5GC indication; the first indication information is inter CIOT RAT redirection (or CIOT Inter-RAT Redirection); or the first indication information is inter CIOT system redirection (or CIOT Inter-System Redirection).

The redirection indication information may be sent using an N2 message, for example, an N2 notify message, an N2 initial UE context setup message, an N2 UE context modification message, an N2 UE context release message, or an N2 downlink transport message. Alternatively, the redirection indication information may be sent using an S1 application plane (S1-AP) message, for example, an S1-AP notify message, an S1-AP initial UE context setup message, an S1-AP UE context modification message, an S1-AP UE context release message, or an S1-AP downlink transport message. For example, when the first system is a 5GS, and a second system is an EPS, the redirection indication information may be sent using the N2 message. When the first system is an EPS, and a second system is a 5GS, the redirection indication information may be sent using the S1-AP message. N2 is an interface between a mobility management network element in the 5GS and an access network element in the 5GS, and S1-AP is an interface between a mobility management network element in the EPS and an access network element in the EPS.

According to the redirection method in this embodiment of this application, when determining that redirection of a terminal to the second system needs to be triggered, the mobility management network element in the first system sends the redirection indication information to the access network element in the first system. After receiving the redirection indication information, the access network element in the first system sends the handover required message to the mobility management network element in the first system to trigger a handover procedure, in order to hand over the terminal from the first system to the second system. Therefore, according to the redirection method in this embodiment of this application, a problem of redirection between two different systems can be resolved. In addition, when the first system is an EPS, and the second system is a 5GS, a problem of redirection of the terminal from the EPS to the 5GS can be resolved. When the first system is a 5GS, and the second system is an EPS, a problem of redirection of the terminal from the 5GS to the EPS can be resolved.

According to a third aspect, a redirection method is provided, and the method includes: receiving, by a terminal, redirection indication information, where the redirection indication information is used to indicate the terminal to redirect to a second system, and redirection of the terminal to the second system is determined based on a CIOT feature supported by the terminal in the second system and a CIOT feature preferred by the terminal in the second system. Subsequently, the terminal selects the second system based on the redirection indication information. Then, the terminal sends a second message to the second system, and the second message is used to request to access the second system.

According to the redirection method in this embodiment of this application, after receiving the redirection indication information, the terminal may perform an access procedure to the second system by sending the second message to a mobility management network element in the second system, such that the terminal can access the second system. Therefore, according to the redirection method in this embodiment of this application, a problem of redirection between two different systems can be resolved. In addition, when a first system is an EPS, and the second system is a 5GS, a problem of redirection of the terminal from the EPS to the 5GS can be resolved. When a first system is a 5GS, and the second system is an EPS, a problem of redirection of the terminal from the 5GS to the EPS can be resolved.

With reference to the third aspect, in a possible implementation, the CIOT feature supported by the terminal in the second system and the CIOT feature preferred by the terminal in the second system may be sent by the terminal to a mobility management network element in a first system.

Optionally, the CIOT feature supported by the terminal in the second system and the CIOT feature preferred by the terminal in the second system may be carried in a registration request message, an attach request message, or a TAU request message. However, this application is not limited thereto. For example, when the first system is a 5GS, and the second system is an EPS, the CIOT feature supported by the terminal in the second system and the CIOT feature preferred by the terminal in the second system may be carried in the registration request message. When the first system is an EPS, and the second system is a 5GS, the CIOT feature supported by the terminal in the second system and the CIOT feature preferred by the terminal in the second system may be carried in the attach request message or the TAU request message.

It should be understood that, the terminal may further send, to the mobility management network element in the first system, a CIOT feature supported by the terminal in the first system and a CIOT feature preferred by the terminal in the first system, such that the terminal may register, with the mobility management network element in the first system, the CIOT feature supported by the terminal in the first system and the CIOT feature preferred by the terminal in the first system. For example, the CIOT feature supported by the terminal in the first system and the CIOT feature preferred by the terminal in the first system may be carried in a registration request message, an attach request message, or a TAU request message.

It should be noted that, the CIOT feature preferred by the terminal in the second system is one or more of CIOT features supported by the terminal in the second system. Similarly, the CIOT feature preferred by the terminal in the first system is one or more of CIOT features supported by the terminal in the first system.

In this application, for example, the CIOT feature may be CP optimization and UP optimization. The CIOT feature supported by the terminal may be either of the CP optimization and the UP optimization, or both the CP optimization and the UP optimization may be supported. However, it should be understood that the CIOT feature is not specifically limited in this application. For example, in an EPS, the CIOT feature may be EPS CP optimization and EPS UP optimization, and in a 5GS, the CIOT feature may be another feature.

With reference to the third aspect, in a possible implementation, the receiving, by a terminal, redirection indication information includes: receiving, by the terminal, the redirection indication information from the mobility management network element in the first system.

For example, the mobility management network element in the first system may directly send the redirection indication information to the terminal. For example, the mobility management network element in the first system may send the redirection indication information to the terminal using a non-access stratum (NAS) message. For example, the redirection indication information may be carried in the NAS message sent by the mobility management network element in the first system to the UE in a procedure such as deregistration, registration, UE configuration, detach, attach, or TAU. For example, when the first system is a 5GS, and the second system is an EPC, the redirection indication information may be carried in a message such as a registration response message, a deregistration request message, or a UE configuration update command message. When the first system is an EPC, and the second system is a 5GS, the redirection indication information may be carried in a message such as an attach response message, a detach request message, or a TAU response message.

With reference to the third aspect, in a possible implementation, the receiving, by a terminal, redirection indication information includes: receiving, by the terminal, the redirection indication information from an access network element in the first system.

The mobility management network element in the first system may first send the redirection indication information to the access network element in the first system, and then the access network element in the first system sends the redirection indication information to the terminal.

For example, the mobility management network element in the first system may send the redirection indication information to the access network element in the first system using an N2 message or an S1-AP message, and then the access network element in the first system adds the redirection indication information to a message sent to the terminal in an AN release procedure, an S1 release procedure, or a handover procedure.

For example, the N2 message may be an N2 notify message, an N2 initial UE context setup message, an N2 UE context modification message, an N2 UE context release message, or an N2 downlink transport message. For example, the S1-AP message may be an S1-AP notify message, an S1-AP initial UE context setup message, an S1-AP UE context modification message, an S1-AP UE context release message, or an S1-AP downlink transport message.

For example, the message sent by the access network element in the first system to the terminal in the AN release procedure may be an AN connection release message. For example, the AN release procedure is a procedure of AN release via inter-system redirection to EPS. For details of the AN release procedure, refer to a reference technology. Details are not described herein in this application.

For example, the message sent by the access network element in the first system to the terminal in the S1 release procedure may be a Radio Resource Control (RRC) connection release message. For details of the S1 release procedure, refer to a reference technology. Details are not described herein in this application.

For example, the message sent by the access network element in the first system to the terminal in the handover procedure may be a handover command message. For example, the handover procedure is a procedure of handover from an EPS to a 5GS. For details of the procedure of handover from the EPS to the 5GS, refer to a reference technology. Details are not described herein in this application.

With reference to the third aspect, in a possible implementation, the second message includes third indication information, and the third indication information is used to indicate that a reason for sending the second message is a redirection request of the first system. As such, a mobility management network element in the second system does not redirect the terminal to the first system based on the third indication information. Therefore, the terminal can be avoided from being redirected back to the first system after being redirected to the second system.

Further, the third indication information is a redirect from 5GC indication or a redirect from EPC indication; the third indication information is inter CIOT RAT redirection (or CIOT Inter-RAT Redirection); or the third indication information is inter CIOT system redirection (or CIOT Inter-System Redirection).

Optionally, the second message may be a registration request message, an attach request message, or a TAU request message. For example, when the first system is a 5GS, and the second system is an EPS, the second message may be the attach request message or the TAU request message. When the first system is an EPS, and the second system is a 5GS, the second message may be the registration request message.

With reference to the third aspect, in a possible implementation, the terminal disables the CIOT feature supported by the terminal in the first system. Therefore, the terminal can be avoided from being redirected back to the first system after being redirected to the second system.

With reference to the third aspect, in a possible implementation, the second message does not include the CIOT feature supported by the terminal in the first system or the CIOT feature preferred by the terminal in the first system, such that the second system does not redirect the terminal to the first system based on the second message. Therefore, the terminal can be avoided from being redirected back to the first system after being redirected to the second system.

According to a fourth aspect, a redirection method is provided, and the method includes: receiving, by an access network element in a first system, redirection indication information sent by a mobility management network element in the first system; and sending, by the access network element in the first system, the redirection indication information to a terminal.

Optionally, the mobility management network element in the first system may send the redirection indication information to the access network element in the first system using an N2 message or an S1-AP message, and then the access network element in the first system adds the redirection indication information to a message sent to the terminal in an AN release procedure, an S1 release procedure, or a handover procedure.

According to the redirection method in this embodiment of this application, after receiving the redirection indication information, the access network element in the first system may send the redirection indication information to the terminal, to trigger the terminal to perform an access procedure to access a second system. Therefore, according to the redirection method in this embodiment of this application, a problem of redirection between two different systems can be resolved. In addition, when the first system is an EPS, and the second system is a 5GS, a problem of redirection of the terminal from the EPS to the 5GS can be resolved. When the first system is a 5GS, and the second system is an EPS, a problem of redirection of the terminal from the 5GS to the EPS can be resolved.

According to a fifth aspect, a communications system is provided, and includes a mobility management network element in a first system and an access network element in the first system.

The mobility management network element in the first system is configured to: determine, based on a CIOT feature supported by a terminal in a second system and a CIOT feature preferred by the terminal in the second system, to redirect the terminal to the second system; and send redirection indication information to the access network element in the first system, where the redirection indication information is used to indicate the access network element in the first system to redirect the terminal from the first system to the second system.

The access network element in the first system is configured to: receive the redirection indication information from the mobility management network element in the first system; and send a handover required message to the mobility management network element in the first system.

In addition, the mobility management network element in the first system is further configured to: receive the handover required message from the access network element in the first system, where the handover required message includes first indication information, and the first indication information is used to indicate that a reason for sending the handover required message is a redirection request of the first system; select a mobility management network element in the second system based on the handover required message; and send a first message to the mobility management network element in the second system, where the first message is used to request to hand over the terminal to the second system.

With reference to the fifth aspect, in a possible implementation, the first message includes second indication information, and the second indication information is used to enable the mobility management network element in the second system not to redirect the terminal to the first system based on the second indication information.

According to a sixth aspect, a communications system is provided, and includes a terminal and a mobility management network element in a first system.

The mobility management network element in the first system is configured to: determine, based on a CIOT feature supported by the terminal in a second system and a CIOT feature preferred by the terminal in the second system, to redirect the terminal to the second system; and send redirection indication information to the terminal, where the redirection indication information is used to indicate the terminal to redirect to the second system.

In addition, the terminal is configured to: receive the redirection indication information from the mobility management network element in the first system; and send a second message to a mobility management network element in the second system, where the second message is used to request to access the second system.

With reference to the sixth aspect, in a possible implementation, the system further includes an access network element in the first system, and the access network element in the first system is configured to: receive the redirection indication information from the mobility management network element in the first system; and send the redirection indication information to the terminal.

With reference to the sixth aspect, in a possible implementation, the second message includes third indication information, and the third indication information is used to indicate that a reason for sending the second message is a redirection request of the first system, such that the mobility management network element in the second system does not redirect the terminal to the first system based on the third indication information.

With reference to the sixth aspect, in a possible implementation, the terminal is further configured to disable a CIOT feature supported by the terminal in the first system. Therefore, the terminal can be avoided from being redirected back to the first system after being redirected to the second system.

With reference to the sixth aspect, in a possible implementation, the second message does not include the CIOT feature supported by the terminal in the first system or a CIOT feature preferred by the terminal in the first system, such that the mobility management network element in the second system does not redirect the terminal to the first system based on the second message.

According to a seventh aspect, a communications apparatus is provided and is configured to perform the method in any one of the first aspect or the possible implementations of the first aspect. For example, the apparatus includes units configured to perform the method in any one of the first aspect or the possible implementations of the first aspect.

According to an eighth aspect, a communications apparatus is provided and is configured to perform the method in any one of the second aspect or the possible implementations of the second aspect. For example, the apparatus includes units configured to perform the method in any one of the second aspect or the possible implementations of the second aspect.

According to a ninth aspect, a communications apparatus is provided and is configured to perform the method in any one of the third aspect or the possible implementations of the third aspect. For example, the apparatus includes units configured to perform the method in any one of the third aspect or the possible implementations of the third aspect.

According to a tenth aspect, a communications apparatus is provided and is configured to perform the method in any one of the fourth aspect or the possible implementations of the fourth aspect. For example, the apparatus includes units configured to perform the method in any one of the fourth aspect or the possible implementations of the fourth aspect.

According to an eleventh aspect, another communications apparatus is provided, and the apparatus includes a transceiver, a memory, and a processor. The transceiver, the memory, and the processor communicate with each other using an internal connection path. The memory is configured to store an instruction. The processor is configured to execute the instruction stored in the memory, to control a receiver to receive a signal and control a transmitter to send a signal, in order to enable the apparatus to perform the method in any one of the first aspect to the fourth aspect or the possible implementations of the first aspect to the fourth aspect.

According to a twelfth aspect, another apparatus is provided, and the apparatus includes a processor. The processor is configured to: after being coupled to a memory and reading an instruction in the memory, perform the method in any one of the first aspect to the fourth aspect or the possible implementations of the first aspect to the fourth aspect according to the instruction.

According to a thirteenth aspect, a computer program product is provided, and the computer program product includes computer program code. When the computer program code is run by a computer, the computer is enabled to perform the method in any possible implementation of any one of the foregoing aspects.

According to a fourteenth aspect, a computer-readable medium is provided, and is used to store a computer program. The computer program includes an instruction used to perform the method in any possible implementation of any one of the foregoing aspects.

According to a fifteenth aspect, a communications chip is provided, and the communications chip stores an instruction. When the instruction is run on a computer device, the communications chip is enabled to perform the method in any possible implementation of any one of the foregoing aspects.

DESCRIPTION OF EMBODIMENTS

The following describes technical solutions of this application with reference to accompanying drawings.

Figure 1:
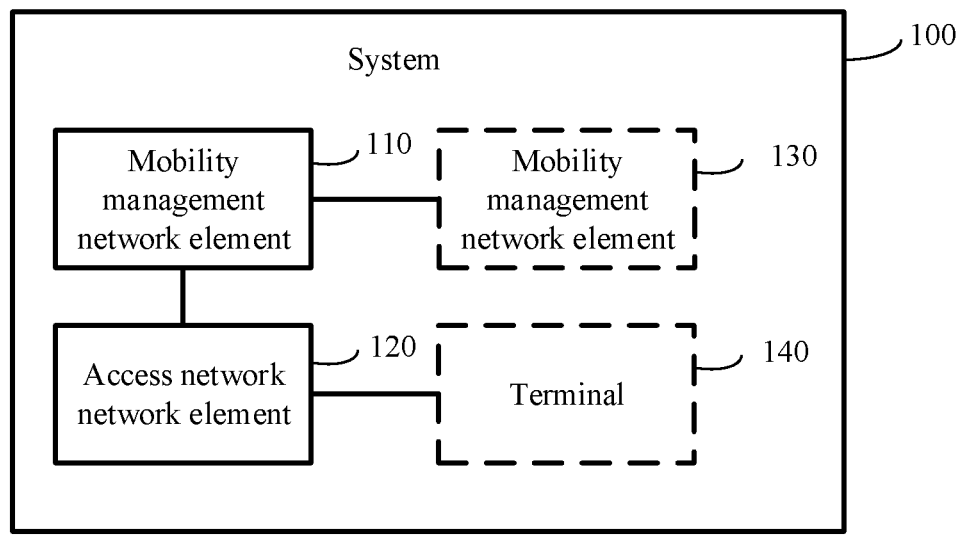
FIG. 1 is a schematic diagram of a system architecture according to this application.

FIG. 1 is a schematic diagram of a system architecture 100 according to this application. As shown in FIG. 1, the system architecture 100 includes a mobility management network element 110 and an access network element 120. Optionally, the system architecture 100 may further include a mobility management network element 130 and a terminal 140. The mobility management network element 110 is a mobility management network element in a first system, the access network element 120 is an access network element in the first system, and the mobility management network element 130 is a mobility management network element in a second system. The first system and the second system are different systems. Optionally, the first system may be a 5GS, and the second system is an EPS. Alternatively, the first system may be an EPS, and the second system is a 5GS. It should be understood that the first system and the second system may alternatively be other systems. This is not limited in this application.

The system architecture 100 may be configured to perform a redirection method provided in this application.

For example, the mobility management network element 110 is configured to: determine, based on a CIOT feature supported by the terminal 140 in the second system and a CIOT feature preferred by the terminal in the second system, to redirect the terminal to the second system; send redirection indication information to the access network element 120, where the redirection indication information is used to indicate the access network element 120 to redirect the terminal from the first system to the second system; receive a handover required message from the access network element 120; select the mobility management network element 130 based on the handover required message; and send a first message to the mobility management network element 130, where the first message is used to request to hand over the terminal to the second system.

Correspondingly, the access network element 120 is configured to: receive the redirection indication information from the mobility management network element 110; and send the handover required message to the mobility management network element 110.

Correspondingly, the mobility management network element 130 is configured to receive the first message from the mobility management network element 110.

Therefore, when determining that the terminal needs to be redirected to the second system, the mobility management network element 110 may indicate, using the redirection indication information, the access network element 120 to trigger a handover procedure. Subsequently, the access network element 120 may send the handover required message to the mobility management network element 110, to trigger inter-radio access technology (inter-RAT) handover (HO), in order to hand over the terminal from the first system to the second system. Therefore, a problem of redirection between two different systems can be resolved. In addition, when the first system is an EPS, and the second system is a 5GS, a problem of redirection of the terminal from the EPS to the 5GS can be resolved. When the first system is a 5GS, and the second system is an EPS, a problem of redirection of the terminal from the 5GS to the EPS can be resolved.

Optionally, the terminal 140 may be a terminal in a connected state, and the mobility management network element 110 and the mobility management network element 130 may communicate with each other using an N26 interface. However, this is not limited in this embodiment of this application.

Optionally, the terminal 140 is configured to send, to the mobility management network element 110, the CIOT feature supported by the terminal in the second system and the CIOT feature preferred by the terminal in the second system. Correspondingly, the mobility management network element 110 is configured to receive, from the terminal 140, the CIOT feature supported by the terminal in the second system and the CIOT feature preferred by the terminal in the second system.

Optionally, the terminal 140 is further configured to send, to the mobility management network element 110, a CIOT feature supported by the terminal in the first system and a CIOT feature preferred by the terminal in the first system. Correspondingly, the mobility management network element 130 is configured to receive, from the terminal 140, the CIOT feature supported by the terminal in the first system and the CIOT feature preferred by the terminal in the first system.

Optionally, the handover required message may include first indication information, and the first indication information is used to indicate that a reason for sending the handover required message is a redirection request of the first system.

Further, the first indication information is a redirect to EPC indication; the first indication information is a redirect to 5th generation mobile communications system core (5GC) network indication (Redirect to 5GC Indication); the first indication information is inter CIOT RAT redirection or CIOT inter-RAT redirection; or the first indication information is inter CIOT system redirection inter CIOT system redirection or CIOT inter-system redirection.

Optionally, the first message includes second indication information, and the second indication information is used to enable the mobility management network element 130 not to redirect the terminal to the first system based on the second indication information.

Further, the second indication information is a redirect from 5GC indication; the second indication information is a redirect from EPC indication; the second indication information is inter CIOT RAT redirection or CIOT inter-RAT redirection; or the second indication information is inter CIOT system redirection (or CIOT inter-system redirection).

Figure 2:
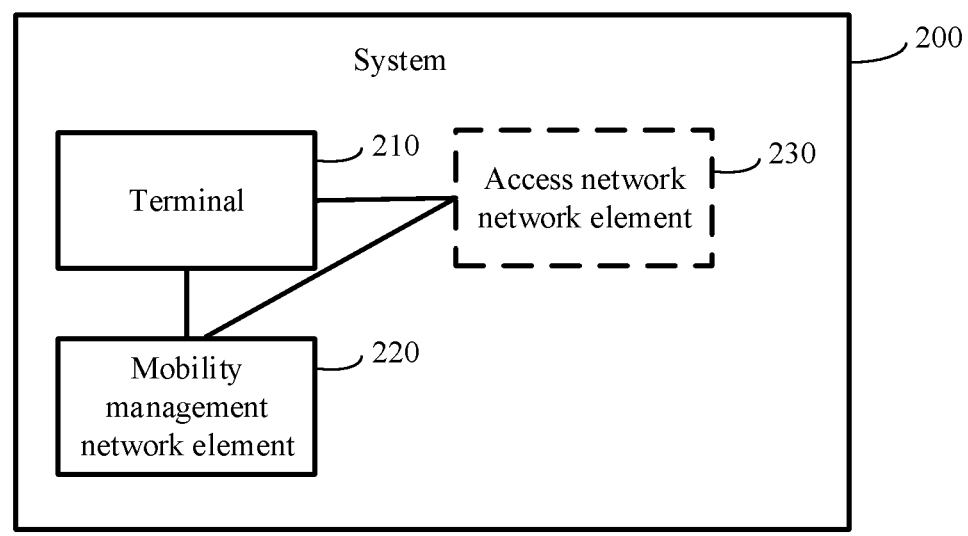
FIG. 2 is a schematic diagram of another system architecture according to this application.

FIG. 2 is a schematic diagram of a system architecture 200 according to this application. As shown in FIG. 2, the system architecture 200 includes a terminal 210 and a mobility management network element 220. Optionally, the system architecture 200 may further include an access network element 230. The mobility management network element 220 is a mobility management network element in a first system, and the access network element 230 is an access network element in the first system. The first system and a second system are different systems. Optionally, the first system may be a 5GS, and the second system is an EPS. Alternatively, the first system may be an EPS, and the second system is a 5GS. It should be understood that the first system and the second system may alternatively be other systems. This is not limited in this application.

The system architecture 200 may be configured to perform another redirection method provided in this application.

For example, the mobility management network element 220 is configured to: determine, based on a CIOT feature supported by the terminal in the second system and a CIOT feature preferred by the terminal in the second system, to redirect the terminal to the second system; and send redirection indication information to the terminal, where the redirection indication information is used to indicate the terminal to redirect to the second system.

Correspondingly, the terminal 210 is configured to: receive the redirection indication information, where the redirection indication information is used to indicate the terminal to redirect to the second system, and redirection of the terminal to the second system is determined based on the CIOT feature supported by the terminal in the second system and the CIOT feature preferred by the terminal in the second system; select the second system based on the redirection indication information; and send a second message to the second system, where the second message is used to request to access the second system.

Therefore, when determining that the terminal 210 needs to be redirected, the mobility management network element 220 may send the redirection indication information to the terminal 210. After receiving the redirection indication information, the terminal may select the second system, and then access the selected second system. Therefore, a problem of redirection between two different systems can be resolved. In addition, when the first system is an EPS, and the second system is a 5GS, a problem of redirection of the terminal from the EPS to the 5GS can be resolved. When the first system is a 5GS, and the second system is an EPS, a problem of redirection of the terminal from the 5GS to the EPS can be resolved.

Optionally, in an implementation, that the mobility management network element 220 is configured to send redirection indication information to the terminal includes the following: The mobility management network element sends the redirection indication information to the access network element 230, and then the access network element 230 sends the redirection indication information to the terminal.

The access network element 230 needs to decapsulate the redirection indication information sent by the mobility management network element 220, and then sends the redirection indication information to the terminal 210. For example, the mobility management network element may send the redirection indication information to the access network element 230 using an N2 message or an S1-AP message, and then the access network element adds the redirection indication information to a message sent to the terminal in an AN release procedure or an S1 release procedure.

Optionally, in another implementation, the mobility management network element 220 directly sends the redirection indication information to the terminal. This means that the access network element 230 performs no processing on the redirection indication information, and performs only a simple forward operation.

Optionally, the terminal 210 is further configured to send, to the mobility management network element 220, the CIOT feature supported by the terminal in the second system and the CIOT feature preferred by the terminal in the second system. Correspondingly, the mobility management network element 220 is configured to receive, from the terminal 210, the CIOT feature supported by the terminal in the second system and the CIOT feature preferred by the terminal in the second system.

Optionally, the second message includes third indication information, and the third indication information is used to indicate that a reason for sending the second message is a redirection request of the first system. As such, a mobility management network element in the second system does not redirect the terminal to the first system based on the third indication information.

Optionally, the third indication information is a redirect from 5GC indication; the third indication information is a redirect from EPC indication; the third indication information is inter CIOT RAT redirection or CIOT inter-RAT redirection; or the third indication information is inter CIOT system redirection or CIOT inter-system redirection.

Optionally, the terminal disables a CIOT feature supported by the terminal in the first system.

Optionally, the second message does not include the CIOT feature supported by the terminal in the first system or a CIOT feature preferred by the terminal in the first system. As such, the mobility management network element in the second system does not redirect the terminal to the first system based on the second message.

It should be understood that, the terminal in this embodiment of this application may be a user equipment (UE), an access terminal, a subscriber unit, a subscriber station, a mobile station, a mobile console, a remote station, a remote terminal, a mobile device, a user terminal, a terminal, a wireless communications device, a user agent, a user apparatus, or the like. Alternatively, the terminal may be a cellular phone, a cordless phone, a Session Initiation Protocol (SIP) phone, a wireless local loop (WLL) station, a personal digital assistant (PDA), a handheld device having a wireless communications function, a computing device, another processing device connected to a wireless modem, a vehicle-mounted device, a wearable device, a terminal device in a future 5G network, a terminal device in a future evolved public land mobile network (PLMN), or the like. This is not limited in this embodiment of this application. For example, the terminal in this application may be a CIOT terminal. The CIOT terminal has application features such as low costs, simple functions, low power consumption, and non-frequent user data transmission.

Figure 3:
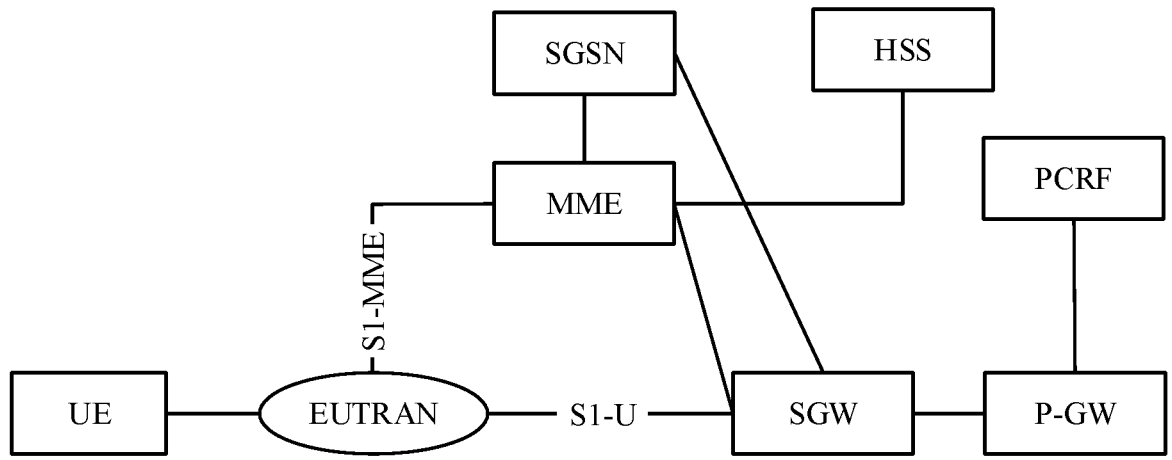
FIG. 3 is a schematic architectural diagram of an EPS.

FIG. 3 is an architectural diagram 300 of an EPS. As shown in FIG. 3, the architectural diagram 300 may include the following network entities.

1. An evolved universal terrestrial radio access network (EUTRAN) is a network including a plurality of evolved NodeBs (eNodeBs), and implements a wireless physical layer function, resource scheduling, radio resource management, radio access control, and a mobility management function. eNodeBs may be connected to each other using an X2 interface, and may transmit data in an X2-based handover process. The eNodeB is connected to a serving gateway (SGW) using a user plane interface (e.g., S1-U), and transmits user data using a general packet radio service (GPRS) tunneling protocol (GTP) user plane (GTP-U); and is connected to a mobility management entity (MME) using a control plane interface (e.g., S1-MME), and implements a function such as radio access bearer control using an S1-AP protocol.

2. The MME is mainly responsible for all control plane functions in user management, namely, session management, which include non-access stratum (NAS) signaling and security, tracking area list management, packet data network (PDN) gateway (P-GW) and SGW selection, or the like.

3. The SGW is mainly responsible for data transmission, data forwarding, and route switching of user equipment, and serves as a local mobility anchor when the user equipment is handed over between eNodeBs (for each user equipment, only one SGW serves the user equipment at each moment).

4. The P-GW serves as an anchor of a packet data network (PDN) connection, and is responsible for Internet Protocol (IP) address assignment of a user equipment, and data packet filtering, rate control, charging information generation, or the like that are of the user equipment.

5. A serving GPRS support node (SGSN) is an access node between a $2^{nd}$ generation (2G) access network such as a Global System for Mobile communications (GSM)/EDGE radio access network (GERAN) or a $3^{rd}$ generation (3G) access network such as a universal terrestrial radio access network (UTRAN) and an EPS core network (e.g., EPC), and is responsible for bearer establishment and data forwarding from the GERAN or the UTRAN to the EPC.

6. A home subscriber server (HSS) stores subscription data of a mobile user.

7. A policy and charging rules function (PCRF) is responsible for charging management and policy control, and includes a policy and charging control (PCC) rule and a quality of service (QoS) rule.

Figure 4:
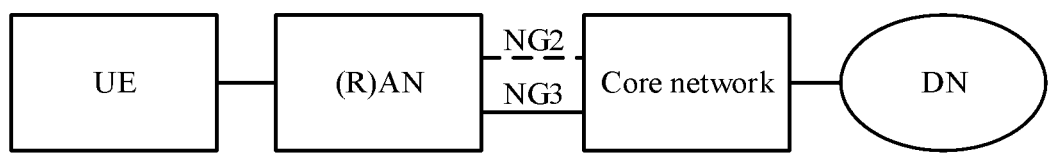
FIG. 4 is a schematic architectural diagram of a simplified 5GS.

FIG. 4 is an architectural diagram 400 of a 5GS. As shown in FIG. 4, the 5GS includes UE, a (radio) access network ((R)AN), a core network, and a data network (DN). The UE, the AN, and the core are main components that constituting an architecture, and may be logically classified into two parts: a user plane and a control plane. The control plane is responsible for mobile network management, and the user plane is responsible for service data transmission. In the figure, an NG2 reference point is between an AN control plane and a core control plane, an NG3 reference point is between an AN user plane and a core user plane, and an NG6 reference point is between the core user plane and the data network.

The UE is an ingress for interaction between a mobile user and a network, and can provide a basic computing capability and storage capability, display a service window to the user, and accept user operation input. The UE uses a next generation air-interface technology to establish a signal connection and a data connection to the AN, to transmit a control signal and service data to a mobile network.

The AN is similar to a base station in a conventional network, is deployed near the UE, provides a network access function for an authorized user in a specific area, and can transmit user data based on a user level and a service requirement using transmission tunnels of different quality. The AN can manage and properly use a resource of the AN, provide an access service for the UE based on a requirement, and forward a control signal and user data between the UE and the core network.

The core is responsible for maintaining subscription data of a mobile network, managing a network element in the mobile network, and providing functions such as session management, mobility management, policy management, and security authentication for the UE. When the UE is attached to the core network, the core network provides network access authentication for the UE; when the UE requests a service, the core network assigns a network resource to the UE; when the UE moves, the core network updates a network resource for the UE; when the UE is idle, the core network provides a fast restoration mechanism for the UE; when the UE is detached from the core network, the core network releases a network resource for the UE; and when the UE has service data, the core network provides a data routing function for the UE, for example, forwards uplink data to the DN, or receives downlink data for the UE from the DN, and forwards the downlink data to the AN, to send the downlink data to the UE.

The DN is a data network providing a business service for a user. Usually, a client is located in the UE, and a server is located in the data network. The data network may be a private network such as a local area network, an external network that is not managed and controlled by an operator, such as the Internet, or a dedicated network jointly deployed by operators, such as a dedicated network deployed to configure an IP multimedia subsystem (IMS) service.

Figure 5:
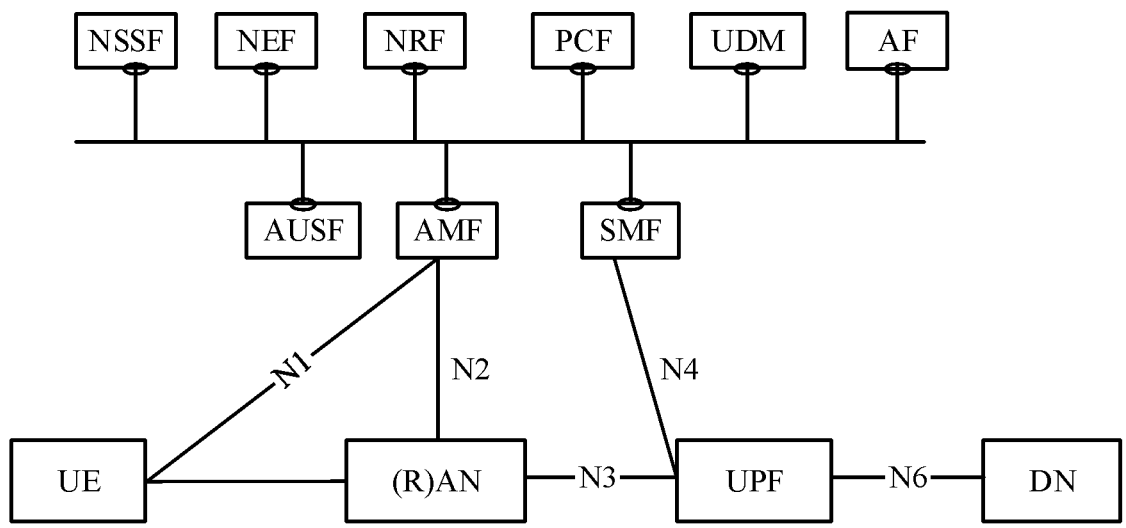
FIG. 5 is a schematic architectural diagram of a 5GS.

FIG. 5 shows a detailed architecture determined based on FIG. 4. A core network user plane includes a user plane function (UPF). A core network control plane includes an authentication server function (AUSF), a core network access and mobility management function (AMF), a session management function (SMF), a network slice selection function (NSSF), a network exposure function (NEF), a network function (NF) repository function (, NRF), unified data management (UDM), a policy control function (PCF), and an application function (AF). Functions of these function entities are as follows.

The UPF performs user data packet forwarding according to a routing rule of the SMF.

The AUSF performs security authentication on UE.

The AMF performs UE access management and mobility management.

The SMF performs UE session management.

The NSSF selects a network slice for the UE.

The NEF exposes a network function to a third party through a northbound API interface.

The NRF stores and selects network function entity information for another network element.

The UDM performs user subscription context management.

The PCF performs user policy management.

The AF performs user application management.

In the architecture shown in FIG. 5, an N1 interface is a reference point between the UE and the AMF. An N2 interface is a reference point between a (R)AN and the AMF, and is configured to send a NAS message or the like. An N3 interface is a reference point between the (R)AN and the UPF, and is configured to transmit user plane data or the like. An N4 interface is a reference point between the SMF and the UPF, and is configured to transmit information such as tunnel identifier information of an N3 connection, data buffering indication information, and a downlink data notification message. An N6 interface is a reference point between the UPF and a DN, and is configured to transmit user plane data or the like.

It should be noted that names of interfaces between the network elements in FIG. 3 to FIG. 5 are only examples, and the interfaces may have other names in other implementations. This is not specifically limited in the embodiments of this application. Names of the network elements (such as the SMF, the AF, and the UPF) included in FIG. 1 to FIG. 5 are also only examples, and do not constitute any limitation on functions of the network elements. In a 5G network and another future network, the foregoing network elements may alternatively have other names. This is not specifically limited in the embodiments of this application. For example, in a $6^{th}$ generation (6G) network, some or all of the foregoing network elements may use terms in 5G, or may use other names, or the like. This is uniformly described herein. Details are not described in the following. In addition, it should be understood that names of messages (or signaling) transmitted between the foregoing network elements are merely examples, and do not constitute any limitation on functions of the messages.

A first system in a redirection method provided in this application may be either of the EPS shown in FIG. 3 and the 5GS shown in FIG. 5, and a second system may be the other system in the EPS shown in FIG. 3 and the 5GS shown in FIG. 5. For example, the first system in this application may be the EPS, and correspondingly, the second system is the 5GS. Alternatively, the first system in this application may be the 5GS, and correspondingly, the second system is the EPS. However, it should be understood that this application does not exclude a possibility that the first system and the second system may be other existing systems or future systems. In a scenario in which the first system is the EPS and the second system is the 5GS, a mobility management network element in the first system in this application may be an MME, a mobility management network element in the second system may be an AMF, an access network element in the first system may be an EUTRAN or one or more eNodeBs in the EUTRAN, and an access network element in the second system may be a (R)AN. Certainly, if the first system and the second system are other existing systems or future systems, network elements in this application are corresponding network elements in these systems. It should be understood that the terminal in this application may be the UE in the system described above.

To make a person skilled in the art better understand this application, redirection in this application is described below in detail by separately using an example in which a terminal is redirected from a 5GS to an EPS and an example in which a terminal is redirected from an EPS to a 5GS. For example, in a scenario in which a terminal is redirected from a 5GS to an EPS, a first system is the 5GS, a second system is the EPS, the terminal is UE, a mobility management network element in the first system is an AMF, a mobility management network element in the second system is an MME, an access network element in the first system is an S-RAN, and an access network element in the second system is a T-RAN. In a scenario in which a terminal is redirected from an EPS to a 5GS, the terminal is UE, a first system is the EPS, a second system is the 5GS, a mobility management network element in the first system is an MME, a mobility management network element in the second system is an AMF, an access network element in the first system is an S-RAN, and an access network element in the second system is a T-RAN.

Figure 6:
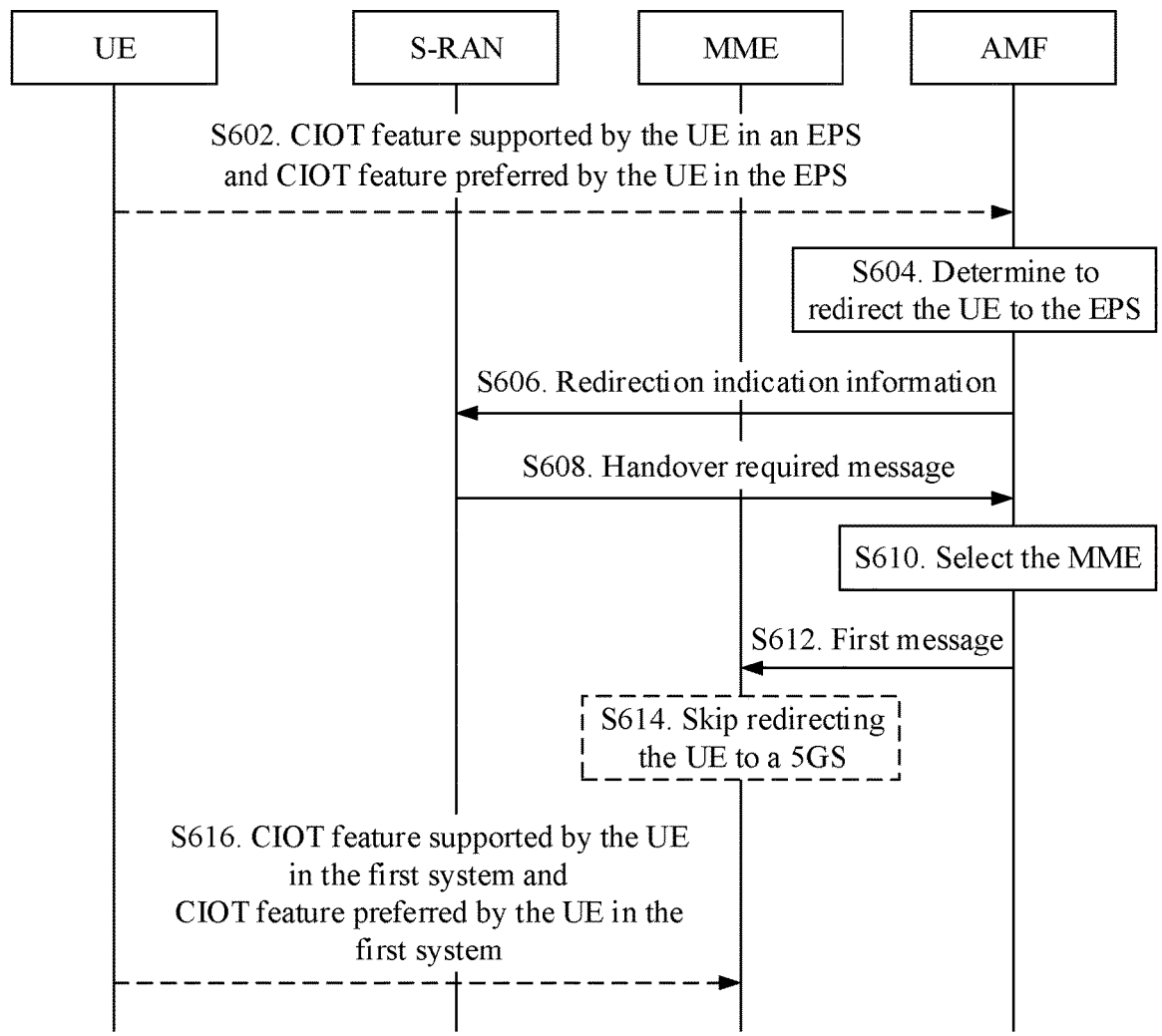
FIG. 6 is a schematic flowchart of a redirection method according to this application.
Figure 7:
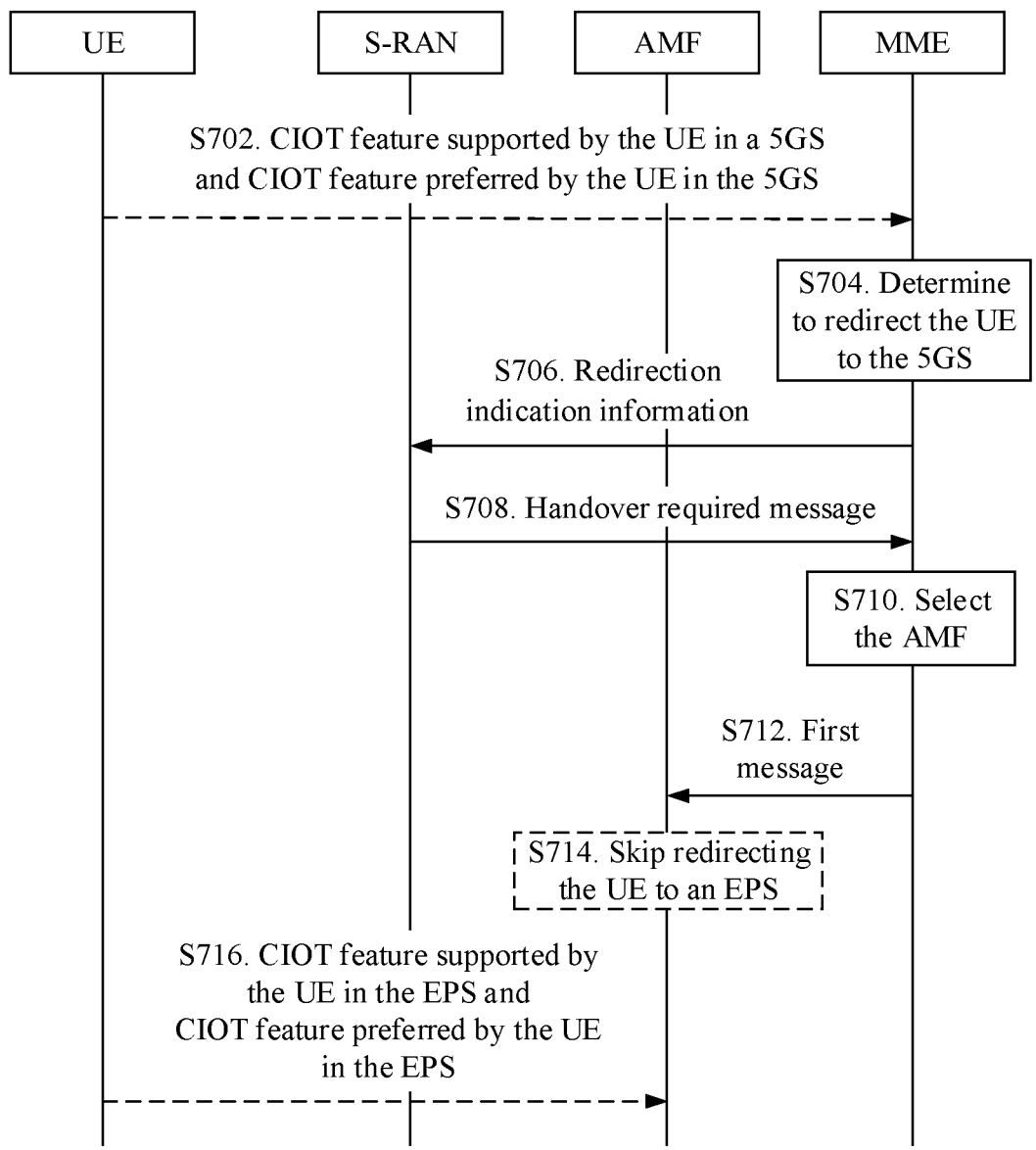
FIG. 7 is a schematic flowchart of a redirection method according to this application.

FIG. 6 and FIG. 7 show redirection methods according to this application. The method shown in FIG. 6 may be applied to a scenario in which UE is redirected from a 5GS to an EPS, and the method shown in FIG. 7 may be applied to a scenario in which UE is redirected from an EPS to a 5GS. Further, the methods shown in FIG. 6 and FIG. 7 may be applied to UE in a connected state, and an AMF and an MME may communicate with each other using an N26 interface. However, this is not limited in the embodiments of this application. It should be understood that the methods shown in FIG. 6 and FIG. 7 may be applied to the system architecture 100 described above.

FIG. 6 is a schematic flowchart of a redirection method 600 according to an embodiment of this application. Referring to FIG. 6, the method 600 mainly includes S604 to S612. Optionally, the method 600 may further include S602, S614, and/or S616.

S602. UE sends, to an AMF, a CIOT feature supported by the UE in an EPS and a CIOT feature preferred by the UE in the EPS.

For example, when the UE supports a corresponding CIOT feature in the EPS, the CIOT feature supported by the UE in the EPS and the CIOT feature preferred by the UE in the EPS may be registered with the AMF.

Optionally, the CIOT feature supported by the UE in the EPS and the CIOT feature preferred by the UE in the EPS may be carried in a registration request message in a registration procedure.

It should be understood that the UE may further send, to the AMF, a CIOT feature supported by the UE in a 5GS and a CIOT feature preferred by the UE in the 5GS. In this way, the UE may register, with the AMF, the CIOT feature supported by the UE in the 5GS and the CIOT feature preferred by the UE in the 5GS. For example, the CIOT feature supported by the UE in the 5GS and the CIOT feature preferred by the UE in the 5GS may be carried in the registration request message.

In this application, the CIOT feature supported by the UE in the EPS is also referred to as an EPS CIOT capability of the UE. Similarly, the CIOT feature supported by the UE in the 5GS is also referred to as a 5GS CIOT capability of the UE. For example, the CIOT feature may be CP optimization and UP optimization. The CIOT feature supported by the UE may be either of the CP optimization and the UP optimization, or both the CP optimization and the UP optimization may be supported. However, it should be understood that the CIOT feature is not specifically limited in this application. For example, in the EPS, the CIOT feature may be EPS CP optimization and EPS UP optimization, and in the 5GS, the CIOT feature may be another feature. The CIOT feature preferred by the UE in the EPS is one or more of CIOT features supported by the UE in the EPS. Similarly, the CIOT feature preferred by the UE in the 5GS is one or more of CIOT features supported by the UE in the 5GS. The preferred CIOT feature is a feature preferentially used by the UE when the UE supports one or more CIOT features. For example, when the UP optimization and the CP optimization are supported, the preferred feature is the CP optimization.

S604. The AMF determines, based on the CIOT feature supported by the UE in the EPS and the CIOT feature preferred by the UE in the EPS, to redirect the UE to the EPS.

Optionally, the CIOT feature supported by the UE in the EPS and the CIOT feature preferred by the UE in the EPS may be obtained in step S602, or may be obtained in another manner, for example, obtained from the 5GS in a handover procedure. This is not limited in this embodiment of this application.

For example, the AMF may determine, according to an operator policy and based on a load balancing status, to redirect the UE to the EPS. For example, when the 5GS detects that the AMF is overloaded and the UE supports the CIOT feature in the EPS, the AMF may actively redirect the UE to the EPS. In addition, the AMF may alternatively determine, with reference to one or more of information of: a radio access technology (RAT) information that can be used by the UE to perform access that is reported by an access network element in the 5GS, load information of a target core network (CN) in an area in which the UE is located, subscription information indicating whether the UE can access the 5GS and/or the EPS, or the like, to redirect the UE to the EPS.

S606. The AMF sends redirection indication information to an S-RAN. The redirection indication information is used to indicate the S-RAN to redirect the UE from the 5GS to the EPS.

Optionally, the redirection indication information may be sent using an N2 message, for example, an N2 notify message, an initial UE context setup message, a UE context modification message, a UE context release message, or a downlink transport message.

S608. The S-RAN sends a handover required message to the AMF. The handover required message may include first indication information, and the first indication information is used to indicate that a reason for sending the handover required message is a redirection request of the 5GS.

For example, after receiving the redirection indication information, the S-RAN may learn that the AMF needs to redirect the UE to the EPS. Then, the S-RAN sends the handover required message to the AMF, to trigger a procedure of handover from the 5GS to the EPS.

Optionally, the first indication information is a redirect to EPC indication or inter CIOT RAT redirection.

S610. The AMF selects an MME after receiving the handover required message.

After learning that the reason for sending the handover required message is the redirection request of the 5GS, the AMF selects the MME based on the CIOT feature supported by the UE in the EPS and the CIOT feature preferred by the UE in the EPS.

S612. The AMF sends a first message to the MME. The first message is used to request to hand over the UE to the EPS or an EPC.

After S612 is performed, a related network element in the 5GS and a related network element in the EPS, for example, the AMF, the S-RAN, the MME, and a T-RAN, may perform a subsequent handover procedure, to hand over the UE to the EPS.

Optionally, the first message may be a relocation request message or a relocation complete message. However, this embodiment of this application is not limited thereto.

In conclusion, according to the redirection method in this embodiment of this application, after the AMF determines that redirection of the UE to the EPS needs to be triggered, the AMF sends the redirection indication information to the S-RAN. After receiving the redirection indication information, the S-RAN may send the handover required message to the AMF, to trigger a handover procedure. Then, the AMF sends the first message to the MME to start handover, such that the UE can be handed over from the 5GS to the EPS. Therefore, according to the redirection method in this embodiment of this application, a problem of redirection of the UE from the 5GS to the EPS can be resolved.

Optionally, the first message may include second indication information, and the second indication information is used to enable the MME not to redirect the UE to the 5GS based on the second indication information.

It should be understood that the second indication information may be the same as or different from the first indication information. This is not limited in this embodiment of this application. For example, the second indication information is a redirect from 5GC indication or inter CIOT RAT redirection.

Correspondingly, the method may further include the following step.

S614. The MME skips redirecting the UE to the 5GS based on the second indication information.

For example, the MME may not redirect the UE to the 5GS based on the second indication information within a period of time (for example, within a preset time period or within a time period configured by a network).

Therefore, according to the redirection method in this embodiment of this application, the UE can be prevented from being redirected back to a source system (namely, the 5GS or a 5GC) after being redirected to a target system (namely, the EPS or the EPC).

Optionally, the method may further include the following steps.

S616. The UE sends, to the MME, the CIOT feature supported by the UE in the 5GS and the CIOT feature preferred by the UE in the 5GS.

Therefore, when the UE needs to be redirected to the 5GS, the MME may perform a related redirection operation based on the CIOT feature supported by the UE in the 5GS and the CIOT feature preferred by the UE in the 5GS.

For example, the UE may add, to a TAU request message in a TAU procedure, the CIOT feature supported by the UE in the 5GS and the CIOT feature preferred by the UE in the 5GS.

It should be noted that an execution sequence of S614 and S616 is not limited in this application.

FIG. 7 is a schematic flowchart of a redirection method 700 according to an embodiment of this application. The method 700 may mainly include S704 to S712. Optionally, the method 700 may further include S702 and/or S714.

S702. UE sends, to an MME, a CIOT feature supported by the UE in a 5GS and a CIOT feature preferred by the UE in the 5GS.

For example, when the UE supports a corresponding CIOT feature in the 5GS, the CIOT feature supported by the UE in the 5GS and the CIOT feature preferred by the UE in the 5GS may be registered with the MME.

Optionally, the CIOT feature supported by the UE in the 5GS and the CIOT feature preferred by the UE in the 5GS may be carried in an attach request message in an attach procedure or a TAU request message in a TAU procedure.

It should be understood that the UE may further send, to the MME, a CIOT feature supported by the UE in an EPS and a CIOT feature preferred by the UE in the EPS. In this way, the UE may register, with the MME, the CIOT feature supported by the UE in the EPS and the CIOT feature preferred by the UE in the EPS. For example, the CIOT feature supported by the UE in the EPS and the CIOT feature preferred by the UE in the EPS may be carried in the attach request message or the TAU request message.

In this application, the CIOT feature supported by the UE in the EPS is also referred to as an EPS CIOT capability of the UE. Similarly, the CIOT feature supported by the UE in the 5GS is also referred to as a 5GS CIOT capability of the UE. For example, the CIOT feature may be CP optimization and UP optimization. The CIOT feature supported by the UE may be either of the CP optimization and the UP optimization, or both the CP optimization and the UP optimization may be supported. However, it should be understood that the CIOT feature is not specifically limited in this application. For example, in the EPS, the CIOT feature may be EPS CP optimization and EPS UP optimization, and in the 5GS, the CIOT feature may be another feature. The CIOT feature preferred by the UE in the EPS is one or more of CIOT features supported by the UE in the EPS. Similarly, the CIOT feature preferred by the UE in the 5GS is one or more of CIOT features supported by the UE in the 5GS. The preferred CIOT feature is a feature preferentially used by the UE when the UE supports one or more CIOT features. For example, when the UP optimization and the CP optimization are supported, the preferred feature is the CP optimization.

S704. The MME determines, based on the CIOT feature supported by the UE in the 5GS and the CIOT feature preferred by the UE in the 5GS, to redirect the UE to the 5GS.

Optionally, the CIOT feature supported by the UE in the 5GS and the CIOT feature preferred by the UE in the 5GS may be obtained in step S702, or may be obtained in another manner, for example, obtained from the EPS in a handover procedure. This is not limited in this embodiment of this application.

For example, the MME may determine, according to an operator policy and based on a load balancing status, to redirect the UE to the 5GS. For example, when an EPC detects that the MME is overloaded and the UE supports the CIOT feature in the 5GS, the MME may actively redirect the UE to the 5GS. In addition, the MME may alternatively determine, with reference to one or more of information of: a RAT information that can be used by the UE to perform access that is reported by an access network element in the EPS, load information of a target CN in an area in which the UE is located, subscription information indicating whether the UE can access the 5GS and/or the EPS, or the like, to redirect the UE to the 5GS.

S706. The MIME sends redirection indication information to an S-RAN. The redirection indication information is used to indicate the S-RAN to redirect the UE from the EPS to the 5GS.

Optionally, the redirection indication information may be sent using an S1-AP message, for example, an S1-AP notify message, an initial UE context setup message, an UE context modification message, an UE context release message, or an downlink transport message.

S708. The S-RAN sends a handover required message to the MIME. The handover required message may include first indication information, and the first indication information is used to indicate that a reason for sending the handover required message is a redirection request of the EPS.

For example, after receiving the redirection indication information, the S-RAN may learn that the MIME needs to redirect the UE to the 5GS. Then, the S-RAN sends the handover required message to the MME, to trigger a procedure of handover from the EPS to the 5GS.

Optionally, the handover required message may include the first indication information, and the first indication information is used to indicate that the reason for sending the handover required message is the redirection request of the EPS.

Optionally, the first indication information is a redirect to 5GS indication or inter CIOT RAT redirection.

S710. The MIME selects an AMF based on the handover required message.

After learning that the reason for sending the handover required message is the redirection request of the EPS, the MIME selects the AMF based on the CIOT feature supported by the UE in the 5GS and the CIOT feature preferred by the UE in the 5GS.

S712. The MIME sends a first message to the AMF. The first message is used to request to hand over the UE to the 5GS or a 5GC.

After S712 is performed, a related network element in the 5GS and a related network element in the EPS, for example, the AMF, the S-RAN, the MIME, and a T-RAN, may perform a subsequent handover procedure, to hand over the UE to the 5GS.

Optionally, the first message may be a relocation request message or a relocation complete message. However, this embodiment of this application is not limited thereto.

In conclusion, according to the redirection method in this embodiment of this application, after the MME determines that redirection of the UE to the 5GS needs to be triggered, the MIME sends the redirection indication information to the S-RAN. After receiving the redirection indication information, the S-RAN may send the handover required message to the MME, to trigger a handover procedure. Then, the MME sends the first message to the AMF to start handover, such that the UE can be handed over from the EPS to the 5GS. Therefore, according to the redirection method in this embodiment of this application, a problem of redirection of the UE from the EPS to the 5GS can be resolved.

Optionally, the first message may include second indication information, and the second indication information is used to enable the AMF not to redirect the UE to the EPS based on the second indication information.

It should be understood that the second indication information may be the same as or different from the first indication information. This is not limited in this embodiment of this application. For example, the second indication information is a redirect from EPC indication or inter CIOT RAT redirection.

Correspondingly, the method may further include the following step.

S714. The AMF skips redirecting the UE to the EPS based on the second indication information.

For example, the AMF may not redirect the UE to the EPS based on the second indication information within a period of time (for example, within a preset time period or within a time period configured by a network).

Therefore, according to the redirection method in this embodiment of this application, the UE can be prevented from being redirected back to a source system (namely, the EPS or the EPC) after being redirected to a target system (namely, the 5GS).

Optionally, the method may further include the following steps.

S716. The UE sends, to the AMF, the CIOT feature supported by the UE in the EPS and the CIOT feature preferred by the UE in the EPS.

Therefore, when the UE needs to be redirected to the EPS, the AMF may perform a related redirection operation based on the CIOT feature supported by the UE and the CIOT feature preferred by the UE.

For example, the UE may add, to a registration request message in a registration procedure, the CIOT feature supported by the UE in the EPS and the CIOT feature preferred by the UE in the EPS.

It should be noted that an execution sequence of S714 and S716 is not limited in this application.

Figure 8:
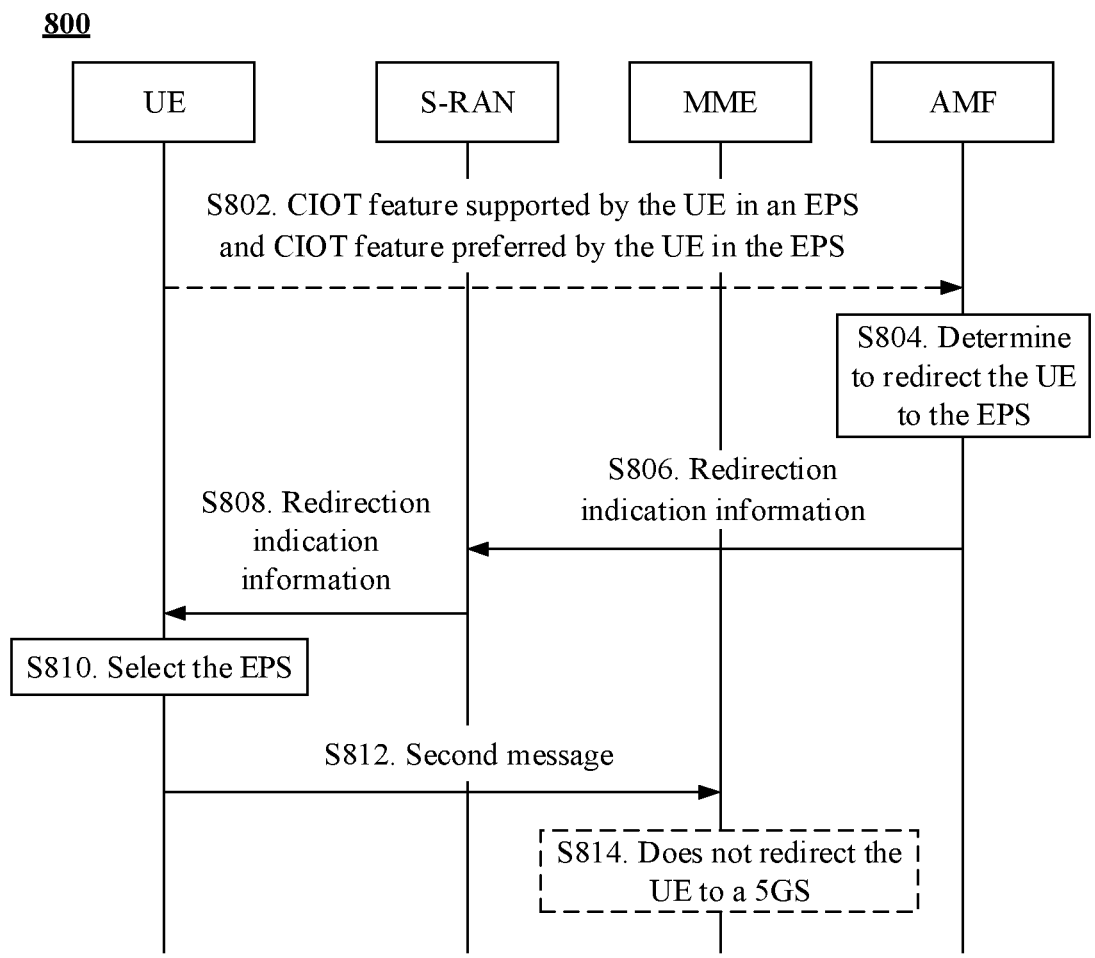
FIG. 8 is a schematic flowchart of another redirection method according to this application.
Figure 9:
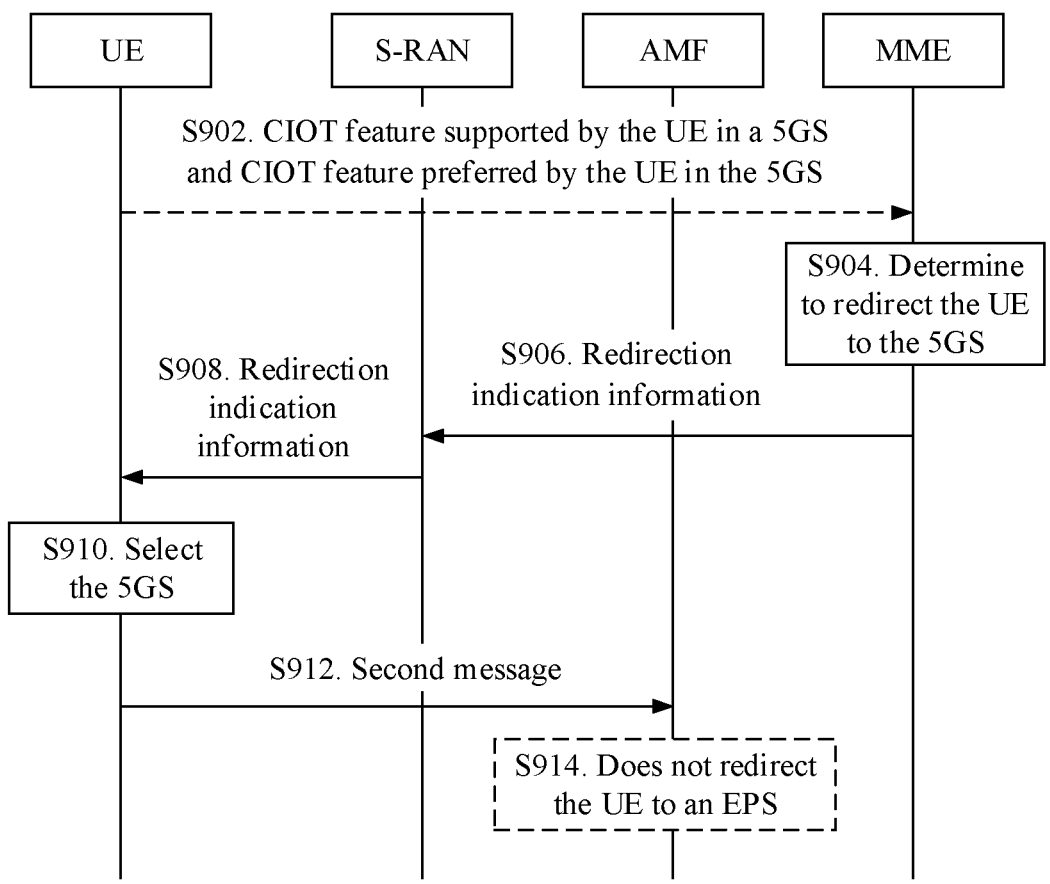
FIG. 9 is a schematic flowchart of another redirection method according to this application.

FIG. 8 and FIG. 9 show other redirection methods according to this application. The method shown in FIG. 8 may be applied to a scenario in which UE is redirected from a 5GS to an EPS, and the method shown in FIG. 9 may be applied to a scenario in which UE is redirected from an EPS to a 5GS. It should be understood that the methods shown in FIG. 8 and FIG. 9 may be applied to the system architecture 200 described above.

FIG. 8 is a schematic flowchart of a redirection method 800 according to an embodiment of this application. The method 800 may mainly include S804 to S812. Optionally, the method 800 may further include S802 and/or S814.

S802. UE sends, to an AMF, a CIOT feature supported by the UE in an EPS and a CIOT feature preferred by the UE in the EPS.

For details of this step, refer to the foregoing description of S602. Details are not described herein again.

S804. The AMF determines, based on the CIOT feature supported by the UE in the EPS and the CIOT feature preferred by the UE in the EPS, to redirect the UE to the EPS.

For details of this step, refer to the foregoing description of S604. Details are not described herein again.

S806. The AMF sends redirection indication information to an S-RAN. The redirection indication information is used to indicate the S-RAN to redirect the UE from a 5GS to the EPS.

For details of this step, refer to the foregoing description of S606. Details are not described herein again.

S808. The S-RAN sends the redirection indication information to the UE.

For example, the S-RAN may add the redirection indication information to a message, such as an AN connection release message, sent to the UE in an access network (AN) release procedure. For example, the AN release procedure is a procedure of AN release via inter-system redirection to EPS. For details of the AN release procedure, refer to a reference technology. Details are not described herein in this application.

For example, the S-RAN may add the redirection indication information to a message, such as a handover command message, sent to the UE in a handover procedure. For example, the handover procedure is a procedure of handover from the 5GS to the EPS. For details of the procedure of handover from the 5GS to the EPS, refer to a reference technology. Details are not described herein in this application.

It can be learned that, in the method 800 different from the method 600, after receiving the redirection indication information, the S-RAN does not send a handover required message to the AMF to trigger the handover procedure, but sends the redirection indication information to the UE to trigger the UE to perform a subsequent procedure.

S810. The UE selects the EPS or selects an EPC.

For example, the UE selects an EPC NAS and an EUTRAN cell, and an EPC connected to the EUTRAN cell supports a CIOT capability of the UE and the CIOT feature preferred by the UE.

S812. The UE sends a second message to the EPS or the EPC, where the second message is used to request to access the EPS.

For example, after selecting the EPS or the EPC, the UE may send the second message to an MME in the selected EPS or EPC, to request to access the EPS. Then, the MIME may perform a subsequent corresponding access procedure based on the second message, such that the UE can access the EPS.

Optionally, the second message may be a TAU request message in a TAU procedure or an attach request message in an attach procedure. It should be understood that, correspondingly, the EPS or the EPC may perform a subsequent TAU procedure or attach procedure based on the second message, such that the UE accesses the EPS.

In conclusion, according to the redirection method in this embodiment of this application, after determining that redirection of the UE to the EPS needs to be triggered, the AMF sends the redirection indication information to the S-RAN, and then the S-RAN sends the redirection indication information to the UE. After receiving the redirection indication information, the UE may perform an EPS access procedure by sending the second message to the MME, such that the UE can access the EPS. Therefore, according to the redirection method in this embodiment of this application, a problem of redirection of the UE from the 5GS to the EPS can be resolved.

Optionally, the second message may include third indication information, and the third indication information is used to indicate that a reason for sending the second message is a redirection request of the 5GS, such that the MIME does not redirect the UE to the 5GS based on the third indication information. The third indication information may be the same as or different from the first indication information or the second indication information described in the method 600. This is not limited in this embodiment of this application. For example, the third indication information is a redirect from 5GC indication or inter CIOT RAT redirection.

Correspondingly, the method may further include the following step.

S814. The MME does not redirect the UE to the 5GS or a 5GC based on the third indication information.

For example, the MME may not redirect the UE back to the 5GS or the 5GC based on the third indication information within a period of time (for example, within a preset time period or within a time period configured by a network).

Therefore, according to the redirection method in this embodiment of this application, the UE can be prevented from being redirected back to a source system (namely, the 5GS or the 5GC) after being redirected to a target system (namely, the EPS).

Optionally, in an embodiment of this application, the UE may not add, to the second message, a CIOT feature supported by the UE in the 5GS and a CIOT feature preferred by the UE in the 5GS, or may disable a CIOT capability of the 5GS.

Therefore, according to the redirection method in this embodiment of this application, the UE can be prevented from being redirected back to a source system (namely, the 5GS or the 5GC) after being redirected to a target system (namely, the EPS).

Optionally, the second message may further include the CIOT feature supported by the UE in the 5GS and the CIOT feature preferred by the UE in the 5GS.

Therefore, when the UE needs to be redirected to the 5GS, the MME may perform a related redirection operation based on the CIOT feature supported by the UE in the 5GS and the CIOT feature preferred by the UE in the 5GS.

FIG. 9 is a schematic flowchart of a redirection method 900 according to an embodiment of this application. The method 900 may mainly include S904 to S912. Optionally, the method 900 may further include S902 and/or S914.

S902. UE sends, to an MME, a CIOT feature supported by the UE in a 5GS and a CIOT feature preferred by the UE in the 5GS.

For details of this step, refer to the foregoing description of S702. Details are not described herein again.

S904. The MME determines, based on the CIOT feature supported by the UE in the 5GS and the CIOT feature preferred by the UE in the 5GS, to redirect the UE to the 5GS.

For details of this step, refer to the foregoing description of S704. Details are not described herein again.

S906. The MME sends redirection indication information to an S-RAN. The redirection indication information is used to indicate the S-RAN to redirect the UE from an EPS to the 5GS.

For details of this step, refer to the foregoing description of S706. Details are not described herein again.

S908. The S-RAN sends the redirection indication information to the UE.

For example, the S-RAN may add the redirection indication information to a message, such as an RRC connection release message, sent to the UE in an S1 release procedure. For details of the S1 release procedure, refer to a reference technology. Details are not described herein in this application.

For example, the S-RAN may add the redirection indication information to a message, such as a handover command message, sent to the UE in a handover procedure. For example, the handover procedure is a procedure of handover from the EPS to the 5GS. For details of the procedure of handover from the EPS to the 5GS, refer to a reference technology. Details are not described herein in this application.

It can be learned that, in the method 900 different from the method 700, after receiving the redirection indication information, the S-RAN does not send a handover required message to the MME to trigger the handover procedure, but sends the redirection indication information to the UE to trigger the UE to perform an access procedure.

S910. The UE selects the 5GS or a 5GC.

For example, the UE selects a 5GC NAS and a new radio (NR) cell, and a 5GC connected to the NR cell supports a CIOT capability of the UE and the CIOT feature preferred by the UE.

S912. The UE sends a second message to the 5GS or the 5GC, where the second message is used to request to access the 5GS.

For example, after selecting the 5GS or the 5GC, the UE may send the second message to an AMF in the selected 5GS or 5GC, to request to access the 5GS. Then, the AMF may perform a subsequent corresponding access procedure based on the second message, such that the UE can access the 5GS.

Optionally, the second message may be a registration request message in a registration procedure. It should be understood that, correspondingly, the 5GS or the 5GC performs a subsequent registration procedure based on the second message, such that the UE accesses the 5GS.

In conclusion, according to the redirection method in this embodiment of this application, after determining that redirection of the UE to the 5GS needs to be triggered, the MME sends the redirection indication information to the S-RAN, and then the S-RAN sends the redirection indication information to the UE. After receiving the redirection indication information, the UE may perform a 5GS access procedure by sending the second message to the AMF, such that the UE can access the 5GS. Therefore, according to the redirection method in this embodiment of this application, a problem of redirection of the UE from the EPS to the 5GS can be resolved.

Optionally, the second message may include third indication information, and the third indication information is used to indicate that a reason for sending the second message is a redirection request of the EPS, such that the AMF does not redirect the UE to an EPC based on the third indication information. The third indication information may be the same as or different from the first indication information or the second indication information described in the method 700. This is not limited in this embodiment of this application. For example, the third indication information is a redirect from EPC indication or inter CIOT RAT redirection.

Correspondingly, the method may further include the following step.

S914. The AMF does not redirect the UE to the EPS or the EPC based on the third indication information.

For example, the AMF may not redirect the UE back to the EPS or the EPC based on the third indication information within a period of time (for example, within a preset time period or within a time period configured by a network).

Therefore, according to the redirection method in this embodiment of this application, the UE can be prevented from being redirected back to a source system (namely, the EPS or the EPC) after being redirected to a target system (namely, the 5GS).

Optionally, in an embodiment of this application, the UE may not add, to the second message, a CIOT feature supported by the UE in the EPS and a CIOT feature preferred by the UE in the EPS, or may disable a CIOT capability of the EPS.

Therefore, according to the redirection method in this embodiment of this application, the UE can be prevented from being redirected back to a source system (namely, the EPS or the EPC) after being redirected to a target system (namely, the 5GS).

Optionally, the second message may further include the CIOT feature supported by the UE in the EPS and the CIOT feature preferred by the UE in the EPS.

Therefore, when the UE needs to be redirected to the EPS, the AMF may perform a related redirection operation based on the CIOT feature supported by the UE in the EPS and the CIOT feature preferred by the UE in the EPS.

Figure 10:
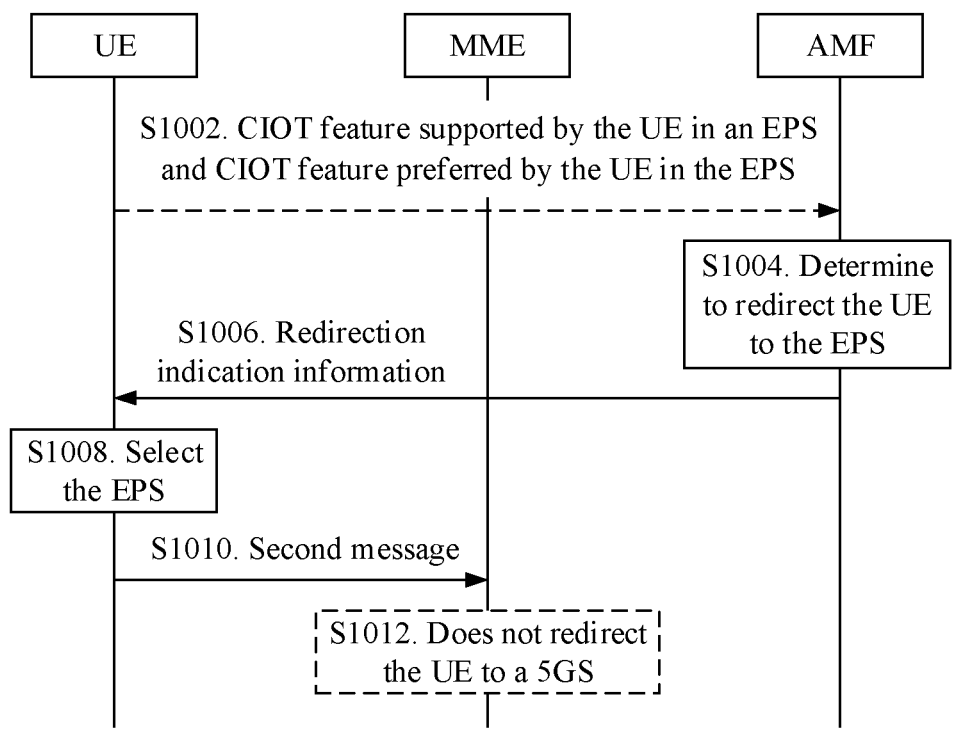
FIG. 10 is a schematic flowchart of still another redirection method according to this application.
Figure 11:
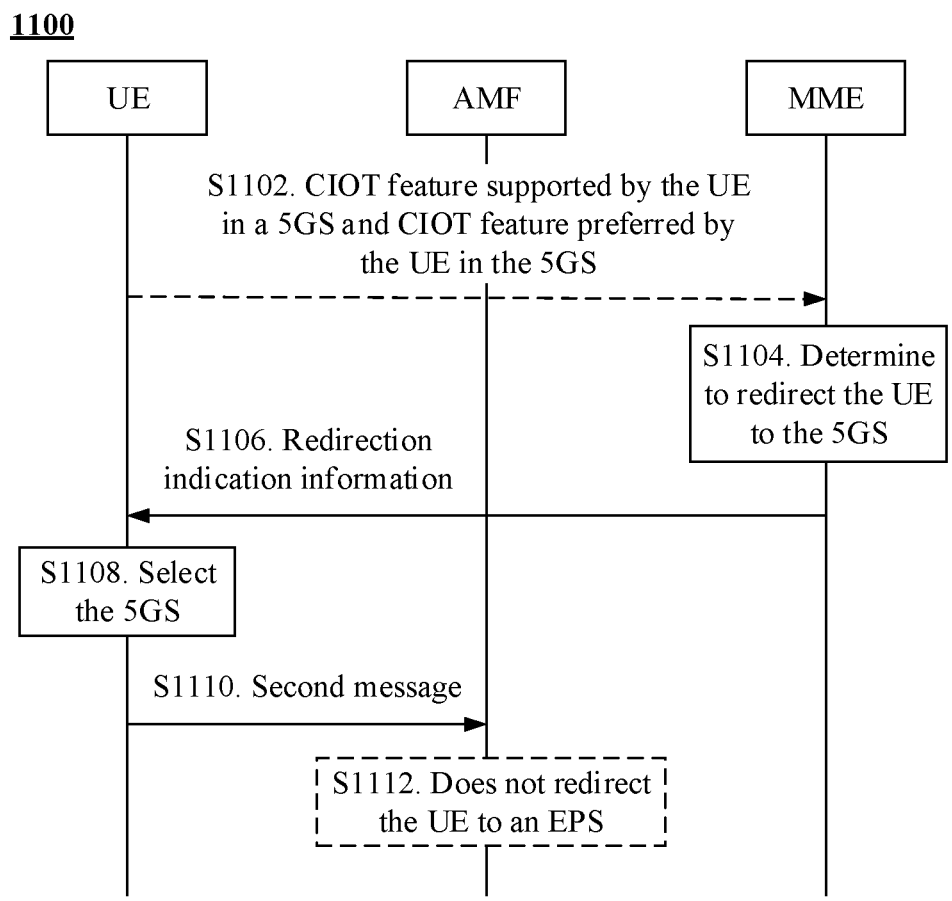
FIG. 11 is a schematic flowchart of still another redirection method according to this application.

FIG. 10 and FIG. 11 show still other redirection methods according to this application. The method shown in FIG. 10 may be applied to a scenario in which UE is redirected from a 5GS to an EPS, and the method shown in FIG. 11 may be applied to a scenario in which UE is redirected from an EPS to a 5GS. It should be understood that the methods shown in FIG. 10 and FIG. 11 may be applied to the system architecture 200 described above.

FIG. 10 is a schematic flowchart of a redirection method 1000 according to an embodiment of this application. The method 1000 may mainly include S1004 to S1010. Optionally, the method 1000 may further include S1002 and/or S1012.

S1002. UE sends, to an AMF, a CIOT feature supported by the UE in an EPS and a CIOT feature preferred by the UE in the EPS.

For details of this step, refer to the foregoing description of S602 or S802. Details are not described herein again.

S1004. The AMF determines, based on the CIOT feature supported by the UE in the EPS and the CIOT feature preferred by the UE in the EPS, to redirect the UE to the EPS.

For details of this step, refer to the foregoing description of S604 or S804. Details are not described herein again.

S1006. The AMF sends redirection indication information to the UE. The redirection indication information is used to indicate the UE to redirect to the EPS.

Optionally, the redirection indication information may be carried in a NAS message, such as a registration response message, a deregistration request message, or a UE configuration update command message, sent by the AMF to the UE in a procedure such as deregistration, registration, or UE configuration.

It can be learned that in the method 800, the AMF first sends the redirection indication information to the S-RAN using an N2 message, and then the S-RAN sends the redirection indication information to the UE using the AN release procedure. However, in the method 1000, the redirection indication information is sent using the NAS message.

S1008. The UE selects the EPS or selects an EPC.

For example, the UE selects an EPC NAS and an EUTRAN cell. An EPC connected to the EUTRAN cell supports a CIOT capability of the UE and the CIOT feature preferred by the UE.

S1010. The UE sends a second message to the EPS or the EPC, where the second message is used to request to access the EPS or the EPC.

For details of this step, refer to the foregoing description of S812. Details are not described herein again.

In conclusion, according to the redirection method in this embodiment of this application, after determining that redirection of the UE to the EPS needs to be triggered, the AMF sends the redirection indication information to the UE. After receiving the redirection indication information, the UE selects the EPS and performs an EPS access procedure, such that the UE can access the EPS. Therefore, according to the redirection method in this embodiment of this application, a problem of redirection of the UE from a 5GS to the EPS can be resolved.

Optionally, in an embodiment of this application, the second message may include third indication information. For details of the third indication information, refer to the description in the method 800. Details are not described herein again.

Correspondingly, the method may further include: S1012. An MME does not redirect the UE to the 5GS based on the third indication information.

For example, the MME may not redirect the UE back to the 5GS or a 5GC based on the third indication information within a period of time (for example, within a preset time period or within a time period configured by a network).

Therefore, according to the redirection method in this embodiment of this application, the UE can be prevented from being redirected back to a source system (the 5GS or the 5GC) after being redirected to a target system (the EPS or the EPC).

Optionally, the second message may further include a CIOT feature supported by the UE in the 5GS and a CIOT feature preferred by the UE in the 5GS.

Therefore, when the UE needs to be redirected to the 5GS, the MME may perform a related redirection operation based on the CIOT feature supported by the UE in the 5GS and the CIOT feature preferred by the UE in the 5GS.

Optionally, in another embodiment of this application, the UE may disable the CIOT feature supported by the UE in the 5GS. Therefore, the UE is not redirected back to the 5GS.

Optionally, in still another embodiment of this application, the second message does not include the CIOT feature supported by the UE in the 5GS or the CIOT feature preferred by the UE in the 5GS. In this way, the MME does not redirect the UE back to the 5GS or the 5GC.

FIG. 11 is a schematic flowchart of a redirection method 1100 according to an embodiment of this application. The method 1100 may mainly include S1104 to S1110. Optionally, the method 1100 may further include S1102 and/or S1112.

S1102. UE sends, to an MME, a CIOT feature supported by the UE in a 5GS and a CIOT feature preferred by the UE in the 5GS.

For details of this step, refer to the foregoing description of S702 or S902. Details are not described herein again.

S1104. The MME determines, based on the CIOT feature supported by the UE in the 5GS and the CIOT feature preferred by the UE in the 5GS, to redirect the UE to the 5GS.

For details of this step, refer to the foregoing description of S704 or S904. Details are not described herein again.

S1106. The MME sends redirection indication information to the UE. The redirection indication information is used to indicate the UE to redirect to the 5GS.

Optionally, the redirection indication information may be carried in a NAS message, such as an attach response message, a detach request message, or a TAU response message, sent by the MME to the UE in a procedure such as detach, attach, or TAU.

It can be learned that in the method 900, the MME first sends the redirection indication information to the S-RAN using an S1-AP message, and then the S-RAN sends the redirection indication information to the UE using the S1 release procedure. However, in the method 1100, the redirection indication information is sent using the NAS message.

S1108. The UE selects the 5GS or a 5GC.

For example, the UE selects a 5GC NAS and an NR cell. A 5GC connected to the NR cell supports a CIOT capability of the UE and the CIOT feature preferred by the UE.

S1110. The UE sends a second message to the 5GS or the 5GC, where the second message is used to request to access the 5GS.

For details of this step, refer to the foregoing description of S912. Details are not described herein again.

In conclusion, according to the redirection method in this embodiment of this application, after determining that redirection of the UE to the 5GS needs to be triggered, the MME sends the redirection indication information to the UE. After receiving the redirection indication information, the UE selects the 5GS and performs a 5GS access procedure, such that the UE can access the 5GS or the 5GC. Therefore, according to the redirection method in this embodiment of this application, a problem of redirection of the UE from an EPS to the 5GS can be resolved.

Optionally, in an embodiment of this application, the second message may include third indication information. For details of the third indication information, refer to the description in the method 900. Details are not described herein again.

Correspondingly, the method may further include: S1112. An AMF does not redirect the UE to the EPS based on the third indication information.

For example, the AMF may not redirect the UE to the EPS or an EPC based on the third indication information within a period of time (for example, within a preset time period or within a time period configured by a network).

Therefore, according to the redirection method in this embodiment of this application, the UE can be prevented from being redirected back to a source system (the EPS or the EPC) after being redirected to a target system (the 5GS or the 5GC).

Optionally, the second message may further include a CIOT feature supported by the UE in the EPS and a CIOT feature preferred by the UE in the EPS. Therefore, when the UE needs to be redirected to the EPS, the AMF may perform a related redirection operation based on the CIOT feature supported by the UE in the EPS and the CIOT feature preferred by the UE in the EPS.

Optionally, in another embodiment of this application, the UE may disable the CIOT feature supported by the UE in the EPS. Therefore, the UE is not redirected back to the EPS.

Optionally, in still another embodiment of this application, the second message does not include the CIOT feature supported by the UE in the EPS or the CIOT feature preferred by the UE in the EPS. In this way, the AMF does not redirect the UE back to the EPS.

It should be understood that, sequence numbers of the foregoing processes do not mean execution sequences. The execution sequences of the processes should be determined based on functions and internal logic of the processes, and should not be construed as any limitation on the implementation processes of the embodiments of this application.

The foregoing describes in detail the redirection methods according to the embodiments of this application with reference to FIG. 1 to FIG. 11. The following describes in detail apparatuses according to the embodiments of this application with reference to FIG. 12 to FIG. 14.

Figure 12:
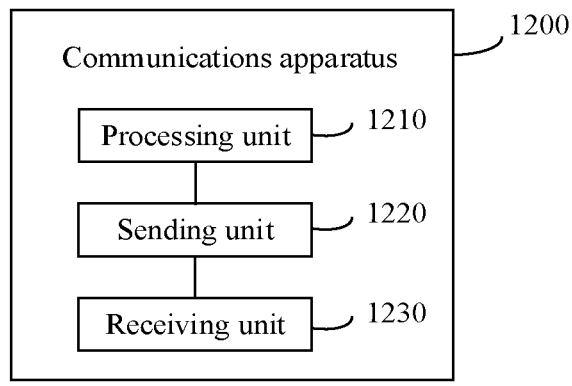
FIG. 12 is a schematic structural diagram of a communications apparatus according to this application.

FIG. 12 shows a communications apparatus 1200 according to an embodiment of this application. The communications apparatus 1200 may be the foregoing mobility management network element in the first system. The communications apparatus 1200 includes a processing unit 1210, a sending unit 1220, and a receiving unit 1230.

The processing unit 1210 is configured to determine, based on a CIOT feature supported by a terminal in a second system and a CIOT feature preferred by the terminal in the second system, to redirect the terminal to the second system.

The sending unit 1220 is configured to send redirection indication information to an access network element in the first system, and the redirection indication information is used to indicate the access network element in the first system to redirect the terminal from the first system to the second system.

The receiving unit 1230 is configured to receive a handover required message from the access network element in the first system. The handover required message includes first indication information, and the first indication information is used to indicate that a reason for sending the handover required message is a redirection request of the first system.

The processing unit 1210 is further configured to select a mobility management network element in the second system based on the handover required message.

The sending unit 1220 is further configured to send a first message to the mobility management network element in the second system, and the first message is used to request to hand over the terminal to the second system.

Optionally, the first message includes second indication information, and the second indication information is used to enable the mobility management network element in the second system not to redirect the terminal to the first system based on the second indication information.

It should be understood that, the communications apparatus 1200 herein is presented in a form of function units. The term "unit" herein may be an application-specific integrated circuit (ASIC), an electronic circuit, a processor (for example, a shared processor, a dedicated processor, or a group processor) configured to execute one or more software or firmware programs, a memory, a merged logic circuit, and/or another suitable component that supports the described function. In an optional example, a person skilled in the art may understand that the communications apparatus 1200 may be the AMF or the MME in the foregoing method embodiments. The communications apparatus 1200 may be configured to perform the procedures and/or steps corresponding to the AMF or the MME in the foregoing method embodiments. To avoid repetition, details are not described herein again.

Figure 13:
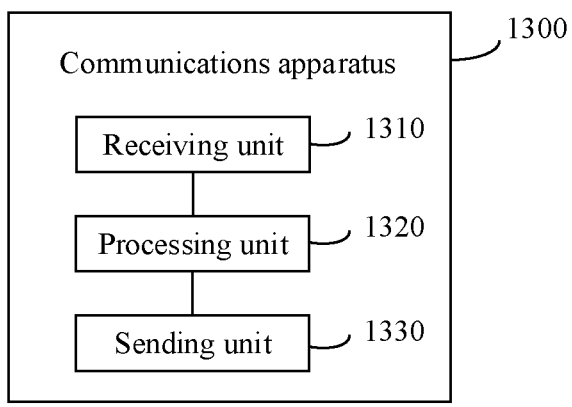
FIG. 13 is a schematic structural diagram of another communications apparatus according to this application.

FIG. 13 shows a communications apparatus 1300 according to an embodiment of this application. The communications apparatus 1300 may be the foregoing UE or terminal, or may be a chip. The communications apparatus 1300 includes a receiving unit 1310, a processing unit 1320, and a sending unit 1330.

The receiving unit 1310 is configured to receive redirection indication information, the redirection indication information is used to indicate the communications apparatus to redirect to a second system, and redirection of the communications apparatus to the second system is determined based on a CIOT feature supported by the communications apparatus in the second system and a CIOT feature preferred by the communications apparatus in the second system.

The processing unit 1320 is configured to select the second system based on the redirection indication information.

The sending unit 1330 is configured to send a second message to the second system, and the second message is used to request to access the second system.

Optionally, the receiving unit 1310 is configured to: receive the redirection indication information from a mobility management network element in a first system; or receive the redirection indication information from an access network element in a first system.

Optionally, the second message includes third indication information, and the third indication information is used to indicate that a reason for sending the second message is a redirection request of the first system. As such, a mobility management network element in the second system does not redirect the communications apparatus to the first system based on the third indication information.

Optionally, the communications apparatus disables a CIOT feature supported by the communications apparatus in the first system.

Optionally, the second message does not include the CIOT feature supported by the communications apparatus in the first system or a CIOT feature preferred by the communications apparatus in the first system. As such, the second system does not redirect the communications apparatus to the first system based on the second message.

It should be understood that, the communications apparatus 1300 herein is presented in a form of function units. The term "unit" herein may be an ASIC, an electronic circuit, a processor (for example, a shared processor, a dedicated processor, or a group processor) configured to execute one or more software or firmware programs, a memory, a merged logic circuit, and/or another suitable component that supports the described function. In an optional example, a person skilled in the art may understand that the communications apparatus 1300 may be the UE in the foregoing method embodiments. The communications apparatus 1300 may be configured to perform the procedures and/or steps corresponding to the UE in the foregoing method embodiments. To avoid repetition, details are not described herein again.

The communications apparatus 1200 and the communications apparatus 1300 in the foregoing solutions have functions of implementing corresponding steps performed by the AMF/MME and the UE in the foregoing methods. The functions may be implemented by hardware, or may be implemented by hardware by executing corresponding software. The hardware or the software includes one or more modules corresponding to the foregoing functions. For example, the sending unit may be replaced with a transmitter, the receiving unit may be replaced with a receiver, and another unit such as a determining unit may be replaced with a processor, to respectively perform a sending operation, a receiving operation, and a related processing operation in the method embodiments.

In the embodiments of this application, the communications apparatuses in FIG. 12 and FIG. 13 may alternatively be chips or chip systems, for example, a system on chip (SoC). Correspondingly, the receiving unit and the sending unit may be a transceiver circuit of the chip. This is not limited herein.

Figure 14:
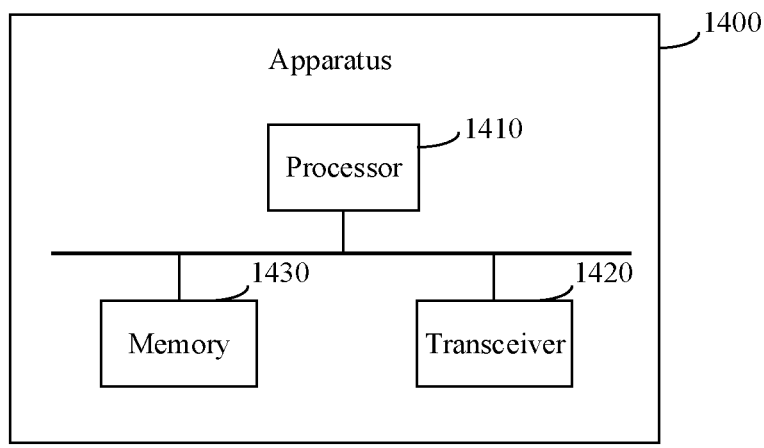
FIG. 14 is a schematic structural diagram of an apparatus according to this application.

It should be understood that the communications apparatus in FIG. 12 or the communications apparatus in FIG. 13 in the embodiments of this application may be implemented using an apparatus 1400 in FIG. 14, and may be configured to perform the steps and/or procedures corresponding to the MME/AMF and the UE in the foregoing method embodiments.

FIG. 14 shows an apparatus 1400 according to an embodiment of this application. The apparatus 1400 includes a processor 1410, a transceiver 1420, and a memory 1430. The processor 1410, the transceiver 1420, and the memory 1430 communicate with each other using an internal connection channel. The memory 1430 is configured to store an instruction. The processor 1410 is configured to execute the instruction stored in the memory 1430, to control the transceiver 1420 to send a signal and/or receive a signal.

In a possible implementation of this application, if the apparatus 1400 is a mobility management network element in a first system, the processor 1410 is configured to: determine, based on a CIOT feature supported by a terminal in a second system and a CIOT feature preferred by the terminal in the second system, to redirect the terminal to the second system; send redirection indication information to an access network element in the first system using the transceiver 1420, where the redirection indication information is used to indicate the access network element in the first system to redirect the terminal from the first system to the second system; receive a handover required message from the access network element in the first system using the transceiver 1420, where the handover required message includes first indication information, and the first indication information is used to indicate that a reason for sending the handover required message is a redirection request of the first system; select a mobility management network element in the second system based on the handover required message; and send a first message to the mobility management network element in the second system using the transceiver 1420, where the first message is used to request to hand over the terminal to the second system.

If the communications apparatus 1400 is a terminal, the processor 1410 is configured to: receive redirection indication information using the transceiver 1420, where the redirection indication information is used to indicate the communications apparatus to redirect to a second system, and redirection of the communications apparatus to the second system is determined based on a CIOT feature supported by the communications apparatus in the second system and a CIOT feature preferred by the communications apparatus in the second system; select the second system based on the redirection indication information; and send a second message to the second system using the transceiver 1420, where the second message is used to request to access the second system.

Optionally, the memory 1430 may include a read-only memory (ROM) and a random-access memory (RAM), and provide an instruction and data for the processor 1410. A part of the memory may further include a non-volatile random-access memory (NVRAM). For example, the memory 1430 may further store information of a device type. The processor 1410 may be configured to execute the instruction stored in the memory. In addition, when the processor 1410 executes the instruction stored in the memory, the processor 1410 is configured to perform the steps and/or procedures corresponding to the terminal or the mobility management network element in the first system in the foregoing method embodiments.

It should be understood that the transceiver 1420 may include a transmitter and a receiver. The transceiver 1420 may further include an antenna. There may be one or more antennas. The memory 1430 may be a separate component, or may be integrated into the processor 1410. Each of the foregoing components or some components may be integrated into a chip for implementation, for example, integrated into a baseband chip for implementation.

In this embodiment of this application, the transceiver in FIG. 14 may alternatively be a communications interface. This is not limited herein.

In the embodiments of this application, for ease of understanding, a plurality of examples are used for description. However, these examples are merely examples, but this does not mean that these examples are optimal implementations for implementing this application.

In the embodiments of this application, for ease of description, a first message, a second message, and names of various other messages are used. However, these messages are merely used as examples to describe content that needs to be carried or an implemented function. Specific names of the messages constitute no limitation on this application. For example, the messages may alternatively be a request message and a response message. These messages may be some specific messages, or may be some fields in the messages. These messages may alternatively represent various service operations.

It should be understood that, the processor in the foregoing apparatus in the embodiments of this application may be a central processing unit (CPU), or the processor may be another general-purpose processor, a digital signal processor (DSP), an ASIC, a field-programmable gate array (FPGA) or another programmable logic device, a discrete gate or transistor logic device, a discrete hardware component, or the like. The general-purpose processor may be a microprocessor, or the processor may be any conventional processor or the like.

In an implementation process, steps in the foregoing methods can be implemented using a hardware integrated logic circuit in the processor, or using instructions in a form of software. The steps of the methods disclosed with reference to the embodiments of this application may be directly performed by a hardware processor, or may be performed using a combination of hardware in the processor and a software unit. The software unit may be located in a mature storage medium in the art, such as RAM, a flash memory, ROM, a programmable read-only memory, an electrically erasable programmable memory, a register, or the like. The storage medium is located in the memory, and the processor executes an instruction in the memory and completes the steps in the foregoing methods in combination with hardware of the processor. To avoid repetition, details are not described herein again.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed systems, apparatuses, and methods may be implemented in other manners. For example, the described apparatus embodiments are merely examples. For example, the division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a Universal Serial Bus (USB) flash drive, a removable hard disk, ROM, RAM, a magnetic disk, or an optical disc.

The foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A redirection method, comprising:
    sending by a terminal to a mobility management network element in a first system, a first cellular Internet of things (CIOT) feature supported by the terminal in a second system and a second CIOT feature preferred by the terminal in the second system;
    receiving, by the terminal, redirection indication information from the mobility management network element in the first system;
    selecting, by the terminal, the second system based on the redirection indication information; and
    sending, by the terminal, a request message to the second system, wherein the request message requests to access the second system.

2. The redirection method according to claim 1, wherein:
    the first system in a 5th generation mobile communications system (5GS), the second system is an evolved packet core (EPC), and the terminal sends the first CIOT feature and the second CIOT feature in a registration request message; or
    the first system is the EPC, the second system is the 5GS, the request message is the registration request message, and the terminal sends the first CIOT feature and the second CIOT feature in an attach request message or a tracking area update request message.

3. The redirection method according to claim 2, wherein the redirection indication information is received after determining to redirect the terminal to the second system based on the first CIOT feature and the second CIOT feature.

4. The redirection method according to claim 1, further comprising disabling, by the terminal, the first CIOT feature based on the redirection indication information received by the terminal from the mobility management network element in the first system.

5. The redirection method according to claim 1, wherein:
    the first system is a 5th generation mobile communications system (5GS), the second system is an evolved packet core (EPC) system, and the request message is an attach request message or a tracking area update request message; or
    the first system is the EPC system, the second system is the 5GS, and the request message is a registration request message.

6. The redirection method according to claim 1, wherein receiving the redirection indication information comprises receiving, by the terminal, a non-access stratum (NAS) message from the mobility management network element, and wherein the NAS message carries the redirection indication information.

7. A communications apparatus, comprising:
    a transceiver configured to:
        send, to a mobility management network element in a first system, a first cellular internet of things (CIOT) feature supported by the communications apparatus in a second system and a second CIOT feature preferred by the communications apparatus in the second system;
        receive redirection indication information from the mobility management network element in the first system; and
        send a request message to the second system, wherein the request message requests to access the second system; and a processor coupled to the transceiver and configured to select the second system based on the redirection indication information.

8. The communications apparatus according to claim 7, wherein:
the first system is a 5th generation mobile communications system (5GS), the second system is an evolved packet core (EPC), and the communications apparatus sends the first CIOT feature and the second CIOT feature in a registration request message; or
the first system is the EPC, the second system is the 5GS, the request message is the registration request message, and the communications apparatus sends the first CIOT feature and the second CIOT feature in an attach request message or a tracking area update request message.

9. The communications apparatus according to claim 8, wherein the redirection indication information is received after determining to redirect the communications apparatus to the second system based on the first CIOT feature and the second CIOT feature.

10. The communications apparatus according to claim 7, wherein the communications apparatus disables the first CIOT feature supported by the communications apparatus based on the redirection indication information received from the mobility management network element in the first system.

11. The communications apparatus according to claim 7, wherein:
the first system is a 5th generation mobile communications system (5GS), the second system is an evolved packet core (EPC) system, and the request message is an attach request message or a tracking area update request message; or
the first system is the EPC system, the second system is the 5GS, and the request message is a registration request message.

12. The communications apparatus according to claim 7, wherein the redirection indication information is included in a non-access stratum (NAS) message.

13. A communications system, comprising:
a second system; and
a first system comprising a mobility management network element and a radio access network, wherein the mobility management network element is configured to:
receive, from a terminal, a first cellular internet of things (CIOT) feature supported by the terminal in the second system and a second CIOT feature preferred by the terminal in the second system;
determine, based on the first CIOT feature supported and the second CIOT feature, to redirect the terminal to the second system; and
send redirection indication information to the radio access network,
wherein the radio access network is configured to send the redirection indication information to the terminal, and wherein the redirection indication information indicates to the terminal to redirect to the second system.

14. The communications system according to claim 13, wherein:
the first system is a 5th generation mobile communications system (5GS), the second system is an evolved packet core (EPC), and the mobility management network element receives the first CIOT feature and the second CIOT feature in a registration request message; or
the first system is the EPC, the second system is the 5GS, and the mobility management network element receives the first CIOT feature and the second CIOT feature in an attach request message or a tracking area update request message.

15. The communications system according to claim 13, wherein:
the first system is a 5th generation mobile communications system (5GS) and the second system is an evolved packet core (EPC) system; or
the first system is the EPC system and the second system is the 5GS.

16. The communications system according to claim 13, wherein the redirection indication information is included in a non-access stratum (NAS) message.

17. A communications apparatus in a first system, comprising:
a processor; and
a memory coupled to the processor and storing instructions that, when executed by the processor, cause the communications apparatus to:
receive from a terminal, a first cellular internet of things (CIOT) feature supported by the terminal in a second system and a second CIOT feature preferred by the terminal in the second system;
determine, based on the first CIOT feature and the second CIOT feature, to redirect the terminal to the second system; and
send redirection indication information to the terminal.

18. The communications apparatus according to claim 17, wherein:
the first system is a 5th generation mobile communications system (5GS), the second system is an evolved packet core (EPC), and the communications apparatus receives the first CIOT feature and the second CIOT feature in a registration request message; or
the first system is the EPC, the second system is the 5GS, and the communications apparatus receives the first CIOT feature and the second CIOT feature in an attach request message or a tracking area update request message.

19. The communications apparatus according to claim 17, wherein:
the first system is a 5th generation mobile communications system (5GS) and the second system is an evolved packet core (EPC) system; or
the first system is the EPC system and the second system is the 5GS.

20. The communications apparatus according to claim 17, wherein the redirection indication information is included in a non-access stratum (NAS) message.

21. A redirection method, comprising:
receiving, by a mobility management network element in a first system from a terminal, a first cellular internet of things (CIOT) feature supported by the terminal in a second system and a second CIOT feature preferred by the terminal in the second system;
determining, by the mobility management network element based on the first CIOT feature and the second CIOT feature, to redirect the terminal to the second system; and
sending, by the mobility management network element in the first system, redirection indication information to the terminal, wherein the redirection indication information indicates the terminal to redirect to the second system.

22. The redirection method according to claim 21, wherein:
- the first system is a 5th generation mobile communications system (5GS), the second system is an evolved packet core (EPC), and the mobility management network element receives the first CIOT feature and the second CIOT feature in a registration request message; or
- the first system is the EPC, the second system is the 5GS, and the mobility management network element receives the first CIOT feature and the second CIOT feature in an attach request message or a tracking area update request message.

23. The redirection method according to claim 21, wherein the first system is a 5th generation mobile communications system (5GS), the second system is an evolved packet core (EPC), and the redirection method further comprises receiving, by the mobility management network element, an attach request message or a tracking area update request message from the terminal; or
- the first system is the EPC, the second system is the 5GS, and the redirection method further comprises receiving, by the mobility management network element, a registration request message from the terminal.

24. The redirection method according to claim 21, wherein sending the redirection indication information comprises sending, by the mobility management network element in the first system, a non-access stratum message to the terminal, and wherein the non-access stratum message carries the redirection indication information.

25. A redirection method, comprising:
- receiving, by a mobility management network element in a first system from a terminal, a first cellular internet of things (CIOT) feature supported by the terminal in a second system and a second CIOT feature preferred by the terminal in the second system;
- determining, by the mobility management network element based on the first CIOT feature and the second CIOT feature, to redirect the terminal to the second system;
- sending, by the mobility management network element in the first system, redirection indication information to a radio access network, wherein the redirection indication information indicates the terminal to redirect to the second system; and
- sending, by the radio access network, the redirection indication information to the terminal.

26. The redirection method according to claim 25, wherein:
- the first system is a 5th generation mobile communications system (5GS), the second system is an evolved packet core (EPC), and the mobility management network element receives the first CIOT feature and the second CIOT feature in a registration request message; or
- the first system is the EPC, the second system is the 5GS, and the mobility management network element receives the first CIOT feature and the second CIOT feature in an attach request message or a tracking area update request message.

27. The method according to claim 25, wherein:
- the first system is a 5th generation mobile communications system (5GS), the second system is an evolved packet core (EPC), and the second system is configured to receive an attach request message or a tracking area update request message; or
- the first system is an EPC, the second system is a 5GS, and the second system is configured to receive a registration request message.

28. The method according to claim 25, wherein sending the redirection indication information to the radio access network comprises sending, by the mobility management network element in the first system, a non-access stratum message to the radio access network, wherein the non-access stratum message carries the redirection indication information, and wherein sending the redirection indication information to the terminal comprises sending, by the radio access network, the non-access stratum message to the terminal.

* * * * *